US010678983B1

(12) United States Patent
Sun et al.

(10) Patent No.: US 10,678,983 B1
(45) Date of Patent: Jun. 9, 2020

(54) LOCAL RETIMING OPTIMIZATION FOR CIRCUIT DESIGNS

(71) Applicant: Xilinx, Inc., San Jose, CA (US)

(72) Inventors: Shangzhi Sun, San Jose, CA (US); Chaithanya Dudha, San Jose, CA (US); Bing Tian, San Jose, CA (US); Ashish Sirasao, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 100 days.

(21) Appl. No.: 15/987,372

(22) Filed: May 23, 2018

(51) Int. Cl.
*G06F 30/3312* (2020.01)
*G06F 30/30* (2020.01)
*G06F 111/20* (2020.01)
*G06F 119/12* (2020.01)

(52) U.S. Cl.
CPC .......... *G06F 30/3312* (2020.01); *G06F 30/30* (2020.01); *G06F 2111/20* (2020.01); *G06F 2119/12* (2020.01)

(58) Field of Classification Search
CPC .............. G06F 17/5031; G06F 17/5045; G06F 2217/84; G06F 2217/02; G06F 30/3312; G06F 30/30; G06F 2119/12; G06F 2111/20
See application file for complete search history.

(56) References Cited

U.S. PATENT DOCUMENTS

| 8,037,443 | B1* | 10/2011 | Krishnaswamy | G06F 17/505 716/108 |
| 8,091,057 | B1 | 1/2012 | Suthar et al. | |
| 8,381,142 | B1* | 2/2013 | Hutton | G06F 17/5054 716/100 |
| 8,423,939 | B1* | 4/2013 | Hurst | G06F 17/505 703/19 |
| 8,918,748 | B1* | 12/2014 | Chiu | G06F 17/5054 716/102 |
| 8,929,152 | B1* | 1/2015 | Gamsa | G11C 7/20 365/189.011 |
| 9,529,952 | B1* | 12/2016 | Gamsa | G06F 17/505 |
| 10,162,918 | B1* | 12/2018 | Iyer | G06F 17/5045 |
| 10,296,701 | B1* | 5/2019 | Iyer | G06F 17/5081 |
| 2005/0132316 | A1* | 6/2005 | Suaris | G06F 17/5031 716/108 |
| 2018/0018417 | A1* | 1/2018 | Iyer | G06F 17/5045 |
| 2018/0137226 | A1* | 5/2018 | Iyer | G06F 17/5031 |
| 2018/0349544 | A1* | 12/2018 | Iyer | G06F 17/5081 |

* cited by examiner

*Primary Examiner* — Nha T Nguyen
(74) *Attorney, Agent, or Firm* — Kevin T. Cuenot

(57) ABSTRACT

Local retiming for a circuit design includes determining, using computer hardware, a load of a synchronous circuit element within the circuit design tagged for forward retiming, traversing, using the computer hardware, each input of the load backward through the circuit design until a sequential circuit element or a primary input is reached, and adding, using the computer hardware, each synchronous circuit element encountered in the traversing to a forward retiming list. In response to determining that forward retiming criteria is met for the forward retiming list, the computer hardware modifies the circuit design by creating a new synchronous circuit element at an output of the load.

20 Claims, 14 Drawing Sheets

LOCAL RETIMING OPTIMIZATION FOR CIRCUIT DESIGNS

TECHNICAL FIELD

This disclosure relates to integrated circuits (ICs) and, more particularly, to local retiming optimizations for circuit designs for implementation within ICs.

BACKGROUND

Implementing a circuit design within an integrated circuit (IC), whether a programmable IC or an application specific IC (ASIC), entails processing the circuit design through a design flow. The design flow includes multiple, different phases. These phases generally include synthesis, placement, and routing.

Synthesis refers to the process of converting, or translating, an abstract, programmatic description of a circuit into a low-level design implementation. The abstract, programmatic description of the circuit describes behavior of the circuit and is also referred to as a "behavioral description" or a "register transfer level (RTL) description" of the circuit. The behavioral description is often specified using a hardware description language (HDL). The low-level design implementation generated through synthesis typically is specified as inter-connected logic gates referred to as a netlist.

Synthesis may also include mapping. Mapping is the process of correlating, or matching, the logic gates of the low-level circuit design to the various types of physical circuit blocks that are actually available in the particular IC in which the circuit design is to be implemented, i.e., the "target IC." For example, since a lookup table (LUT) may implement a complex function, one or more logic gates of the low-level design implementation may be mapped to a single LUT or other programmable tile of the target IC. The mapped circuit design specifies the same functionality as the low-level design implementation, albeit in terms of the particular circuit blocks available on the target IC as opposed to low-level logic gates.

Placement is the process of assigning elements of the synthesized circuit design to particular instances of circuit blocks and/or resources having specific locations on the target IC. Once placed, a circuit element of the circuit design has a specific location on the target IC as opposed to only being assigned to a particular type of circuit block and/or resource as is the case after mapping and prior to placement. The location of a circuit element of a circuit design, once placed, is the location on the target IC of the instance of the circuit block and/or resource to which the circuit element is assigned. Routing is the process of selecting particular routing resources such as wires, programmable interconnect points (PIPs), PIP settings, and/or other interconnect circuitry to electrically couple the various circuit blocks of the target IC after placement.

Modern circuit designs often have aggressive timing, area, and/or power requirements. Significant time is spent processing the circuit design through the design flow in an attempt to meet these requirements.

SUMMARY

In one or more embodiments, a method may include determining, using computer hardware, a load of a synchronous circuit element within a circuit design tagged for forward retiming, traversing, using the computer hardware, each input of the load backward through the circuit design until a sequential circuit element or a primary input is reached, and adding, using the computer hardware, each synchronous circuit element encountered in the traversing to a forward retiming list. The method may also include, in response to determining that forward retiming criteria is met for the forward retiming list, modifying, using the computer hardware, the circuit design by creating a new synchronous circuit element at an output of the load.

In one or more embodiments, a method may include determining, using computer hardware, a driver of a synchronous circuit element within a circuit design tagged for backward retiming, traversing, using the computer hardware, each output of the driver forward through the circuit design until a sequential circuit element or a primary output is reached, and adding, using the computer hardware, each synchronous circuit element encountered in the traversing to a backward retiming list. The method may also include, in response to determining that backward retiming criteria is met for the backward retiming list, modifying, using the computer hardware, the circuit design by creating a new synchronous circuit element at an input of the driver.

In one or more embodiments, a system includes a memory configured to store program code and a processor coupled to the memory. The processor, in response to executing the program code, is configured to initiate operations. The operations may include determining a load of a synchronous circuit element within a circuit design tagged for forward retiming, traversing each input of the load backward through the circuit design until a sequential circuit element or a primary input is reached, and adding each synchronous circuit element encountered in the traversing to a forward retiming list. The operations may also include, in response to determining that forward retiming criteria is met for the forward retiming list, modifying the circuit design by creating a new synchronous circuit element at an output of the load.

In one or more embodiments, a system includes a memory configured to store program code and a processor coupled to the memory. The processor, in response to executing the program code, is configured to initiate operations. The operations may include determining a driver of a synchronous circuit element within a circuit design tagged for backward retiming, traversing each output of the driver forward through the circuit design until a sequential circuit element or a primary output is reached, and adding each synchronous circuit element encountered in the traversing to a backward retiming list. The operations may also include, in response to determining that backward retiming criteria is met for the backward retiming list, modifying the circuit design by creating a new synchronous circuit element at an input of the driver.

In one or more embodiments, a computer program product includes a computer readable storage medium having program code stored thereon. The program code is executable by a processor to perform the various operations described within this disclosure.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
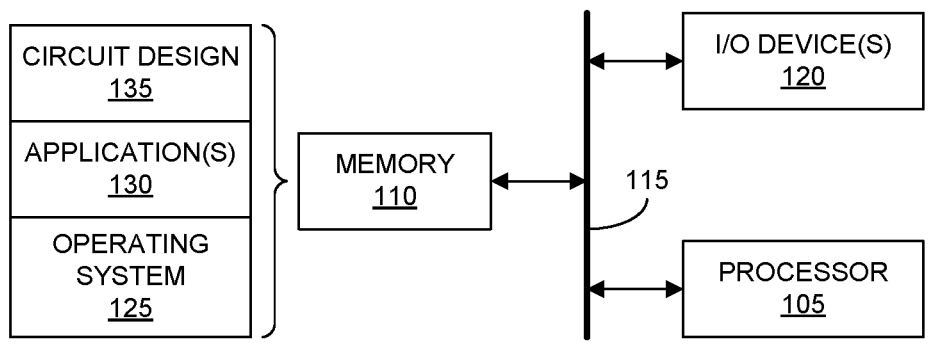
FIG. 1 illustrates an example of a data processing system for use with one or more embodiments described herein.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to local retiming optimizations for circuit designs for implementation within ICs. In accordance with the inventive arrangements described within this disclosure, a system is capable of processing a circuit design to perform local retiming optimizations to improve performance of the circuit design. The local retiming optimizations may improve timing of the circuit design, reduce the area required to implement the circuit design within an IC, and/or reduce the power consumption of the circuit design as implemented within an IC.

Local retiming optimizations refer to operations performed on a limited portion of a circuit design. As an illustrative and nonlimiting example, a system may perform local retiming on a subset of the paths of the circuit design as opposed to all paths of the circuit design. In another example, the system may perform local retiming on paths within a particular module of the circuit design as opposed to across all modules of the circuit design. The portion of the circuit design to which the optimization is applied may be one that the system has determined meets particular selection criteria.

Performing local retiming in accordance with the inventive arrangements described within this disclosure provides several benefits over alternatives such as global retiming techniques. For example, whereas local retiming often reduces area usage and/or power consumption of the circuit design, global retiming often adds circuit elements to a circuit design thereby increasing area usage and/or power consumption. In addition, by operating on specific and/or limited portions of the circuit design, a system is capable of performing local retiming in substantially less time than were global retiming to be performed. Further, processes such as incremental place and/or incremental route often benefit from local retiming optimizations. Local retiming also supports targeted optimizations since users may specify the particular synchronous circuit element or synchronous circuit elements that are to be locally retimed. In some cases, the user may also specify the number of levels the synchronous circuit element is to be moved.

In one or more embodiments, a system is capable of processing one or more paths of the circuit design. The paths may be selected automatically based upon selection criteria or designated by a user. Within the selected paths, the system is capable of identifying one or more synchronous circuit elements for retiming. The synchronous circuit elements may be selected automatically by the system or designated by a user. The system is capable of performing local retiming on the synchronous circuit element(s) of the selected path. The local retiming optimization may be a forward retiming optimization or a backward retiming optimization. Appreciably, the system is capable of performing both forward and backward retiming optimizations on the circuit design.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example system 100 for use with one or more embodiments described herein. System 100 is an example of computer hardware that may be used to implement a computer, a server, a portable computer such as a laptop or a tablet computer, or other data processing system. A system or device implemented using computer hardware is capable of performing the various operations described herein relating to processing a circuit design for implementation within an IC.

In the example of FIG. 1, system 100 includes at least one processor 105. Processor 105 is coupled to memory 110 through interface circuitry 115. System 100 is capable of storing computer readable instructions (also referred to as "program code") within memory 110. Memory 110 is an example of computer readable storage media. Processor 105 is capable of executing the program code accessed from memory 110 via interface circuitry 115.

Memory 110 may include one or more physical memory devices such as, for example, a local memory and a bulk storage device. Local memory refers to non-persistent memory device(s) generally used during actual execution of program code. Examples of local memory include random access memory (RAM) and/or any of the various types of RAM that are suitable for use by a processor during execution of program code (e.g., dynamic RAM or "DRAM" or static RAM or "SRAM"). A bulk storage device refers to a persistent data storage device. Examples of bulk storage devices include, but are not limited to, a hard disk drive (HDD), a solid-state drive (SSD), flash memory, a read-only memory (ROM), an erasable programmable read-only memory (EPROM), electrically erasable programmable read-only memory (EEPROM), or other suitable memory. System 100 may also include one or more cache memories (not shown) that provide temporary storage of at least some program code in order to reduce the number of times program code must be retrieved from a bulk storage device during execution.

Memory 110 is capable of storing program code and/or data. For purposes of illustration, memory 110 stores an operating system 125, one or more application(s) 130, and a circuit design 135. In one or more embodiments, application (s) 130 include an electronic design automation (EDA) application. The EDA application is capable of performing one or more operations of a design flow (e.g., synthesis, placement, routing, and/or bitstream generation) and the various operations described herein relating to local retiming on circuit design 135. System 100 is capable of performing the operations described herein to implement circuit design 135 within a target IC. The target IC may have an architecture the same as or similar to the architecture described in connection with FIG. 13.

System 100, e.g., processor 105, is capable of executing operating system 125 and application(s) 130 to perform the operations described within this disclosure. As such, operating system 125 and application(s) 130 may be considered an integrated part of system 100. Further, it should be appreciated that any data used, generated, and/or operated upon by system 100 (e.g., processor 105) are functional data structures that impart functionality when employed as part of system 100.

Examples of interface circuitry 115 include, but are not limited to, a system bus and an input/output (I/O) bus. Interface circuitry 115 may be implemented using any of a variety of bus architectures. Examples of bus architectures may include, but are not limited to, Enhanced Industry Standard Architecture (EISA) bus. Accelerated Graphics Port (AGP), Video Electronics Standards Association (VESA) local bus, Universal Serial Bus (USB), and Peripheral Component Interconnect Express (PCIe) bus.

System 100 further may include one or more I/O devices 120 coupled to interface circuitry 115. I/O devices 120 may be coupled to system 100, e.g., interface circuitry 115, either directly or through intervening I/O controllers. Examples of I/O devices 120 include, but are not limited to, a keyboard, a display device, a pointing device, one or more communication ports, and a network adapter. A network adapter refers to circuitry that enables system 100 to become coupled to other systems, computer systems, remote printers, and/or remote storage devices through intervening private or public networks. Modems, cable modems, Ethernet cards, and wireless transceivers are examples of different types of network adapters that may be used with system 100.

System 100 may include fewer components than shown or additional components not illustrated in FIG. 1 depending upon the particular type of device and/or system that is implemented. In addition, the particular operating system, application(s), and/or I/O devices included may vary based upon system type. Further, one or more of the illustrative components may be incorporated into, or otherwise form a portion of, another component. For example, a processor may include at least some memory. System 100 may be used to implement a single computer or a plurality of networked or interconnected computers each implemented using the architecture of FIG. 1 or an architecture similar thereto.

The inventive arrangements described within this disclosure are capable of performing local retiming optimizations on circuit design 135. The local retiming optimizations performed by system 100 modify circuit design 135 to improve one or more aspects of circuit performance. For example, system 100 may perform a local retiming optimization to improve timing, reduce area usage, and/or reduce power consumption of circuit design 135.

System 100 is capable of performing the operations described within this disclosure relating to local retiming to achieve an improved Quality of Result (QOR) for circuit design 135. Further, by operating on limited, or local, portions of circuit design 135, e.g., a subset of paths, as opposed to the entirety of circuit design 135, system 100 is able to avoid fluctuations in QOR that often occur when performing global retiming operations.

In addition, system 100 is capable of performing local retiming in less time, e.g., less runtime, than is the case with other techniques for improving QOR (e.g., timing, area, and/or power consumption) such as global retiming. Apart from processing fewer portions of the circuit design, local retiming, as performed by system 100, need not call a timing engine to update timing information for the global netlist, which takes a significant amount of runtime. Rather, system 100 may traverse the particular paths being locally retimed, thereby saving significant runtime. As such, the inventive arrangements facilitate improved operation of the implementation tools, e.g., system 100 itself.

Figure 2:
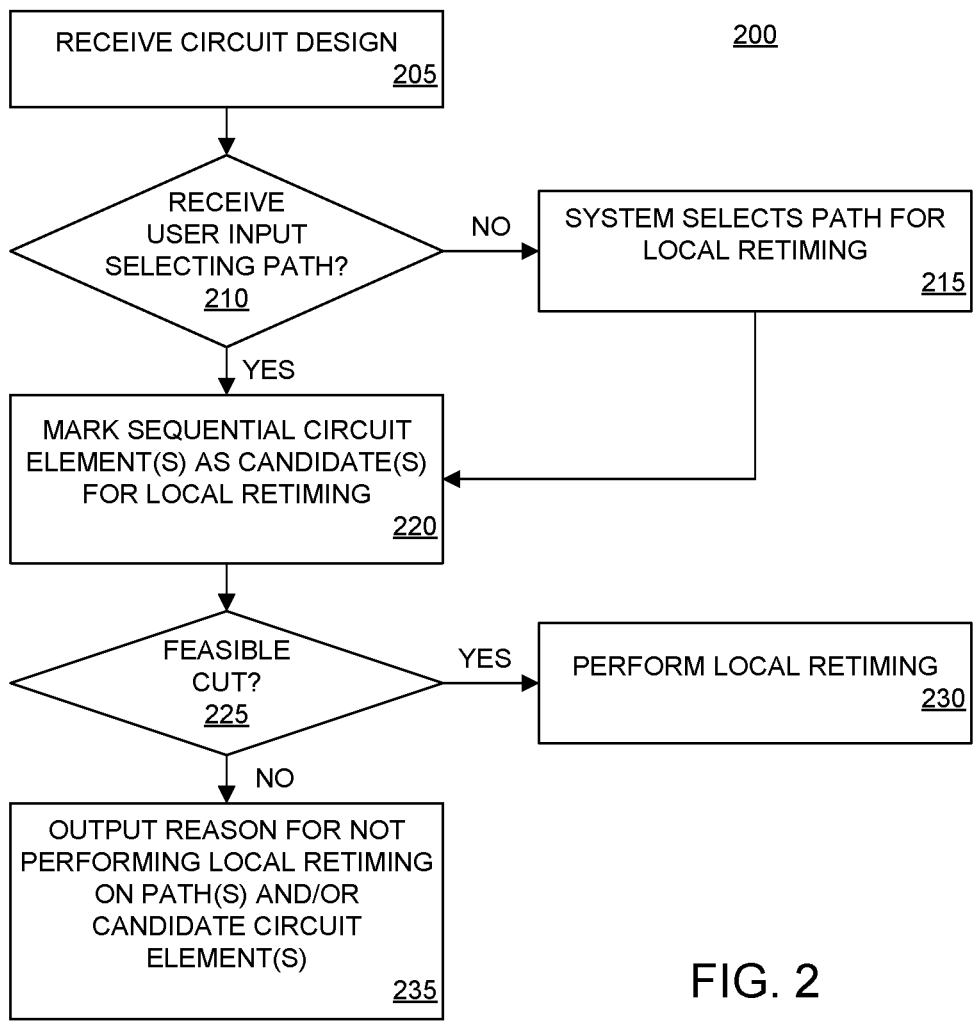
FIG. 2 illustrates an example method of performing local retiming for a circuit design.

FIG. 2 illustrates an example method 200 of performing local retiming for a circuit design. Method 200 may be performed by a system the same as or similar to system 100 described in connection with FIG. 1. Method 200 may begin in a state where a circuit design has undergone synthesis and one or more optimizations such as local retiming may be applied.

In block 205, the system receives the circuit design to be processed. The system may load the circuit design into execution memory. In block 210, the system determines whether a user input selecting a path of the circuit design has been received. In one or more embodiments, the system may also receive a user input specifying whether forward retiming or backward retiming is to be performed on the selected path. If a user input is received selecting a path and/or a type of retiming (e.g., forward or backward for the path), method 200 may continue to block 220. If no user input selecting a path is received, method 200 may continue to block 215.

In block 215, the system is capable of selecting one or more paths that may be processed for local retiming. In one or more embodiments, the system determines a path or paths based upon path selection criteria. The selection criteria may include one or more of timing reduction, area reduction, and/or power reduction criteria. The system is capable of determining the type of local retiming, e.g., forward or backward retiming, to be performed based upon the path selection criteria used. An example of forward retiming is described in connection with FIG. 3. An example of backward retiming is described in connection with FIG. 4.

In one or more embodiments, the system is capable of selecting a path for forward retiming that has a non-synchronous circuit element (e.g., a combinatorial circuit element) driving more than a minimum number of loads. The system may select such a path for forward retiming. Forward retiming of the path may result in a circuit design that requires less area for implementation, consumes less power, and/or has improved timing. Backward retiming of a path may also result in a circuit design that requires less area for implementation, consumes less power, and/or has improved timing.

In one or more other embodiments, the system is capable of selecting a path that does not meet a timing requirement. In that case, the system may select the path for backward retiming in order to improve timing of the path. In one or more embodiments, the system is capable of selecting paths within the circuit design that require balancing of logic levels.

In one or more other embodiments, the system may choose to optimize one or more paths of a circuit design for power and/or area in when the paths have excess positive slack. For example, the system may begin knowing the clock frequency for each module of the circuit design. The system may evaluate the slack (e.g., signal timing) for the modules of the circuit design. As an illustrative and nonlimiting example, the system may identify module A of the circuit design having a slack of +2 nanoseconds and module B of the circuit design having a slack of −2 nanoseconds. In this example, the system is capable of selecting module A and determining that module B has a dependency upon module A. The system may perform one or more timing optimizations on module B to improve timing resulting in a positive slack of 0 picoseconds. In this example, if module A still has a slack of +2 nanoseconds, the system is capable of determining that module A is a candidate for area and/or power optimization through forward or backward retiming. The extra slack allows the system to modify module A for purposes of power reduction and/or area reduction while still maintaining a slack of 0 or more (e.g., a positive slack).

In block 220, the system marks one or more synchronous circuit elements within the selected path, whether selected via block 210 or block 215, as candidates for local retiming. In one or more embodiments, the system is capable of marking each synchronous circuit element within the selected path with a tag or attribute. In one or more other embodiments, a user may manually tag one or more synchronous circuit elements within a selected path with a tag. The tag indicates to the system that retiming is to be attempted on the tagged circuit element. The tag further may specify the type of retiming to be performed on the circuit element. For example, a flip-flop may be tagged as "forward retiming" or as "backward retiming."

In block 225, the system determines whether a feasible cut exists. In one or more embodiments, the system may determine whether marked circuit elements meet retiming criteria. In response to determining that a feasible cut exists, e.g., retiming criteria is met, method 200 may continue to block 230. In block 230, the system performs local retiming. As noted, the system may perform forward retiming or backward retiming on the selected path and/or candidate circuit element(s) of the selected path.

In response to determining that a feasible cut does not exist, e.g., retiming criteria is not met, method 200 may continue to block 235. In block 235, the system is capable of outputting a reason for not performing local retiming on the selected path(s) and/or candidate circuit element(s).

Figure 3:
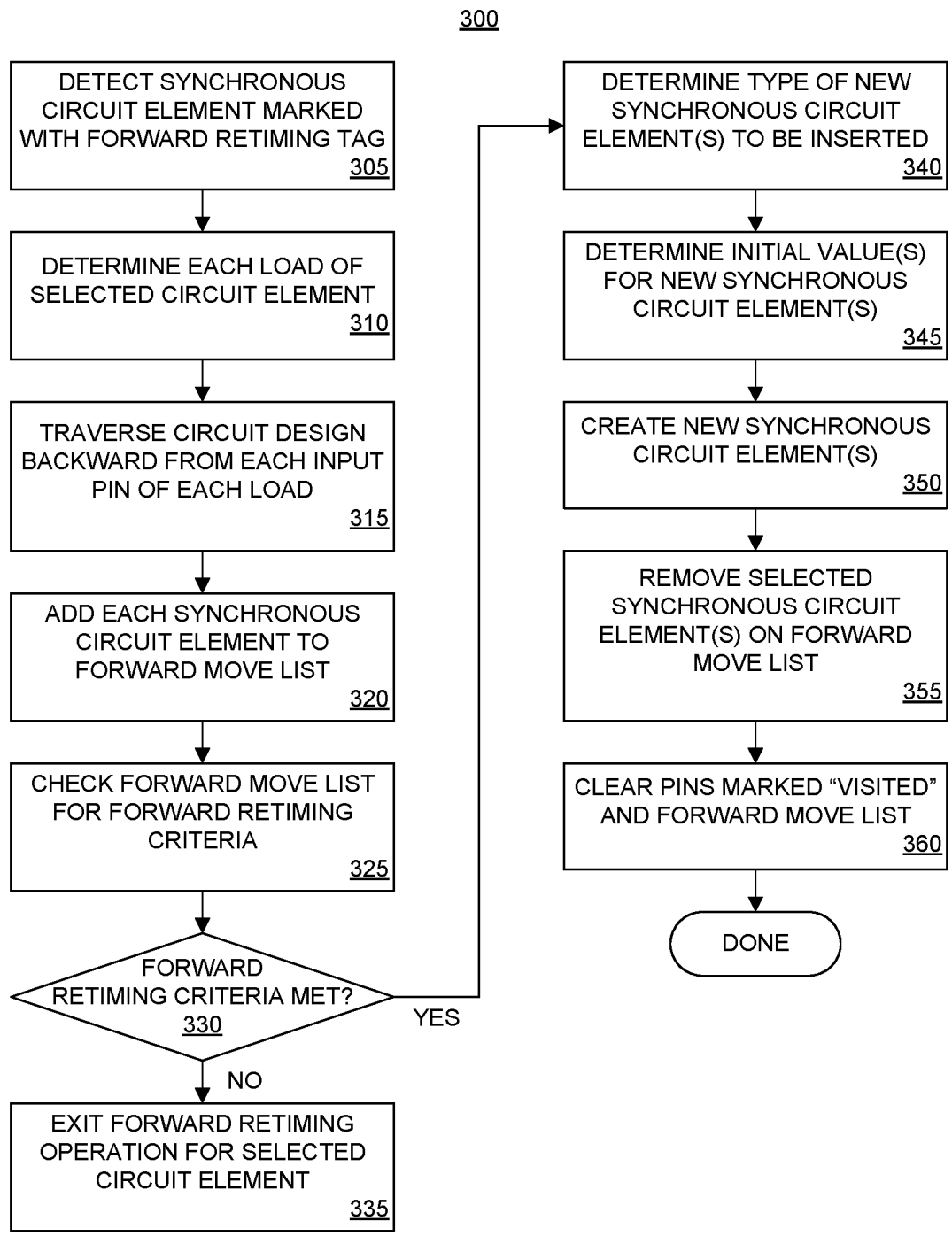
FIG. 3 illustrates an example method of forward retiming for a circuit design.

FIG. 3 illustrates an example method 300 of forward retiming for a circuit design. Method 300 may be performed by a system the same as, or similar to, system 100 described in connection with FIG. 1. Method 300 may begin in a state where a path of the circuit design has been selected by the user or selected automatically by the system for processing. Further, a synchronous circuit element, e.g., a flip-flop, within the selected path has been tagged for forward retiming, whether automatically by the system or by a user.

In block 305, the system detects the synchronous circuit element marked with the forward retiming tag. In block 310, the system is capable of determining each circuit element that is a load of the selected circuit element. In block 315, the system is capable of traversing the circuit design backward (e.g., to the left in the examples described herein) from each input pin of each load. The system is capable of traversing backward until a synchronous circuit element or a primary input of the circuit design is reached. The term "traverse", as used herein, refers to following a signal path.

While traversing backward, the system is capable of tracking each visited pin of the circuit design and marking each visited pin as "visited." The system is also capable of tracking each circuit element, whether synchronous or not, that is visited during the traversing performed in block 315.

In block 320, the system is capable of adding each synchronous circuit element found in traversing backward in block 315 to a forward move list. The system may also add any to the forward move list any primary input of the circuit design reached in traversing backward. In block 325, the system is capable of checking the forward move list to determine whether forward retiming criteria is met. In one or more embodiments, the forward retiming criteria includes each synchronous circuit element on the forward move list having compatible control pins. The forward retiming criteria also specifies that no primary input was reached during the traversal performed in block 315 (e.g., that the forward move list includes no primary input).

In one or more embodiments, synchronous circuit elements in a same control set are said to have compatible control pins. The term "control set" means two or more control pins of two or more different circuit elements that are of a same control pin type and that are driven by a same control signal or a same instance of a driver circuit element. A control set can be a unique set of control and/or clock nets for sequential circuit elements such as flip-flops, latches, slice RAMs, and so forth. Two circuit elements are in a same control set when each of the two circuit elements has a same control pin type (e.g., set, reset, clock enable (e.g., clock), clear) that is driven by a same signal and/or a same driver circuit element (e.g., different instances of a same circuit element). The system may apply the control set membership analysis in cases where the control signal is asynchronous to the circuit element.

In one or more other embodiments, control pin compatibility may be less restrictive than whether synchronous circuit elements are members of a same control set in cases where the control signals are synchronous to the circuit element. As an illustrative and nonlimiting example, two flip-flops that have synchronous reset control signals may be considered compatible despite each resent signal originating from a different circuit element since the control signals may be moved into the data path using combinatorial logic, e.g., an AND gate.

In block 330, the system determines whether the forward retiming criteria is met. In response to determining that the forward retiming criteria is met, method 300 continues to block 340. In response to determining that the forward retiming criteria is not met, method 300 continues to block 335. In block 335, the system exits the forward retiming process for the selected circuit element.

In block 340, system is capable of determining a type of new synchronous circuit element(s), e.g., flip-flop(s), to be inserted in the circuit design. The system may use simulation to determine the type of new synchronous circuit element(s)

to include. For example, the new synchronous circuit element will have control pins that are compatible with the control pins of the synchronous circuit elements on the forward move list. The newly inserted synchronous circuit element(s) may differ from those on the forward move list. As an illustrative and nonlimiting example, for a tagged FDRE type of synchronous circuit element (D-type flip-flop with data, clock enable, and synchronous reset inputs and data output), an FDSE type of synchronous circuit element (D-type flip-flop with data, clock enable, and synchronous set inputs and data output) may be inserted.

In block 345, the system is capable of determining an initial value for the new synchronous circuit element. The initial value is the value loaded into the synchronous circuit element at startup of the IC with the circuit design implemented therein. In one or more embodiments, the system is capable of performing simulation to determine the initial values for synchronous circuit elements to be inserted into the circuit design.

In block 350, the system is capable of creating one or more new synchronous circuit elements of the type determined in block 340 and having the initial value determined in block 345. For example, the system is capable of creating a new synchronous circuit element at the output pin of the load. When applicable, the system is also capable of creating a synchronous circuit element at the output pin of each visited circuit element other than the load that has one or more unvisited load pins (load pins not marked "visited").

In block 355, the system is capable of removing selected ones of the synchronous circuit element(s) on the forward move list from the circuit design. For example, for all visited load pins driven by an output pin of a synchronous circuit element on the forward move list, the system may connect the output pin to the input pin effectively short circuiting the synchronous circuit element and removing the synchronous circuit element from the circuit design.

In block 360, the system is capable clearing the pins of the selected path marked as "visited" and clearing the forward move list.

Figure 4:
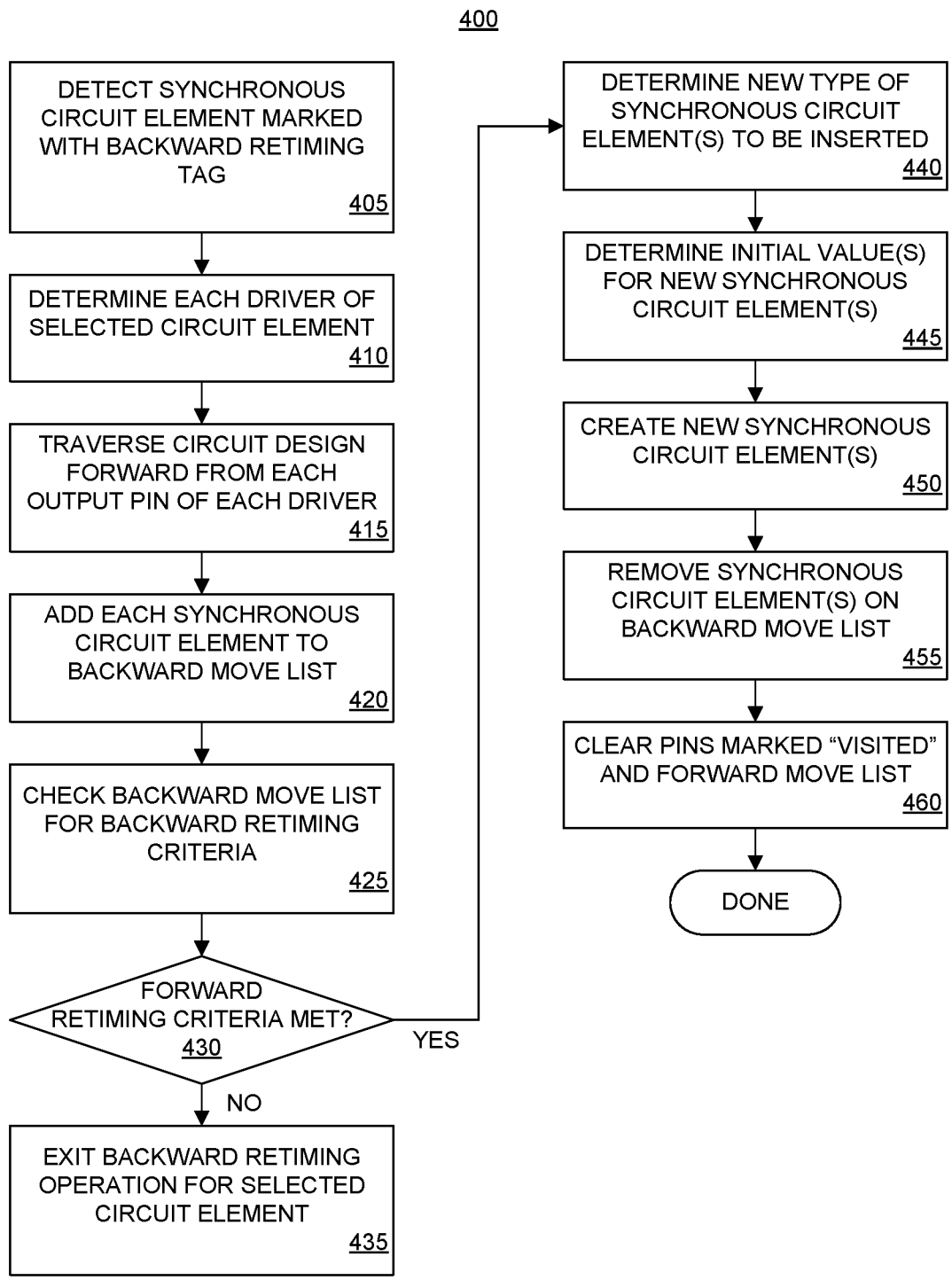
FIG. 4 illustrates an example method of backward retiming for a circuit design.

FIG. 4 illustrates an example method 400 of backward retiming for a circuit design. Method 400 may be performed by a system the same as or similar to system 100 described in connection with FIG. 1. Method 400 may begin in a state where a path of the circuit design has been selected by the user or selected automatically by the system for processing. Further, a synchronous circuit element, e.g., a flip-flop, within the selected path has been tagged for backward retiming, whether automatically by the system or by a user.

In block 405, the system detects the synchronous circuit element marked with the backward retiming tag. In block 410, the system is capable of determining each circuit element that is a driver of the selected circuit element. In block 415, the system is capable of traversing the circuit design forward (e.g., to the right in the examples described herein) from each output pin of each driver of the selected circuit element. The system is capable of traversing forward until a synchronous circuit element or a primary output is reached.

While traversing forward, the system is capable of tracking each visited pin of the circuit design and marking each visited pin as "visited." the system is also capable of tracking each circuit element, whether synchronous or not, that is visited during the traversing performed in block 415.

In block 420, the system is capable of adding each synchronous circuit element found in traversing forward in block 415 to a backward move list. The system may also add to the backward move list any primary output of the circuit design reached in traversing. In block 425, the system is capable of checking the backward move list to determine whether the backward retiming criteria is met. In one or more embodiments, the backward retiming criteria includes each synchronous circuit element on the backward move list having compatible control pins. The backward retiming criteria also specifies that no primary output was reached during the traversal performed in block 415 (e.g., the backward move list includes no primary output).

In block 430, the system determines whether the backward retiming criteria is met. In response to determining that the backward retiming criteria is met, method 400 continues to block 440. In response to determining that the backward retiming criteria is not met, method 400 continues to block 435. In block 435, the system exits the backward retiming process for the selected circuit element.

In block 440, system is capable of determining a type of new synchronous circuit element(s) to be inserted in the circuit design. In one or more embodiments, the type of new synchronous circuit element will be the same type as the tagged synchronous circuit element. For example, the new synchronous circuit element will be compatible with the control pins of the synchronous circuit element(s) on the backward move list.

In block 445, the system is capable of determining initial value(s) for the new synchronous circuit element(s). The initial value is the value loaded into the flip-flop at startup of the circuit design as implemented within an IC. In one or more embodiments, the system is capable of performing Automatic Test Pattern Generation (ATPG) and applying the test patterns to the circuit design to determine initial values for synchronous circuit elements to be inserted into the circuit design.

In block 450, the system is capable of creating one or more new synchronous circuit elements of the type determined in block 440 and having the initial value determined in block 445. For example, the system is capable of creating a new synchronous circuit element at each input pin of the driver. The system is also capable of creating a new synchronous circuit element at each unvisited input pin of each visited combinatorial circuit element.

In block 455, the system is capable of removing each synchronous circuit element on the backward move list from the circuit design. For example, for all the synchronous circuit elements on the backward move list, the system connects the pins driven by the input pin of the synchronous circuit element effectively short circuiting the synchronous circuit element and removing the synchronous circuit element from the circuit design.

In block 460, the system is capable clearing the pins of the selected path marked as "visited" and clearing the backward move list.

Figure 5:
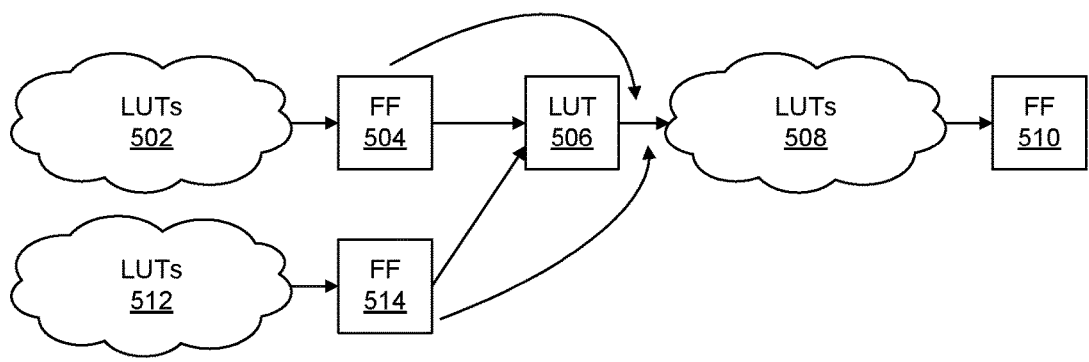
FIG. 5 illustrates an example of forward retiming.

FIG. 5 illustrates an example of forward retiming. The forward retiming illustrated in FIG. 5 may be performed by a system as described herein implementing the operations described in connection with FIG. 3. In the example of FIG. 5, a path of a circuit design is shown that includes combinatorial logic such as lookup tables (LUTs) and synchronous circuit elements such as flip-flops. LUTs (e.g., one or more LUTs) 502 drive flip-flop 504. LUTs 512 drive flip-flop 514. Flip-flops 504 and 514 each have an output that drives LUT 506. LUT 506 drives one or more LUTs 508. LUTs 508 drive flip-flop 510.

For purposes of illustration, consider the case where LUT 506, e.g., a non-synchronous circuit element, has a fanout that exceeds a fanout limit (e.g., drives more than a minimum number of loads). As an illustrative and nonlimiting example, the fanout limit may be 300 loads. Accordingly, LUT 506 drives more than 300 different loads represented as LUTs 508. In one or more embodiments, the system is capable of identifying a path with a non-synchronous circuit element having a fanout exceeding the fanout threshold and selecting the path for forward retiming.

In the example of FIG. 5, the system is capable of performing forward retiming by creating a new flip-flop immediately following LUT 506. The system removes flip-flops 504 and 514 from the path. The new flip-flop is driven by the output of LUT 506. Further, the new flip-flop drives each of the loads previously driven by LUT 506.

The example of FIG. 5 illustrates how the area required to implement a circuit design may be reduced through forward retiming by reducing the number of synchronous circuit elements included in the circuit. The reduction in the number of components within the circuit further reduces power consumption.

Figure 6A:
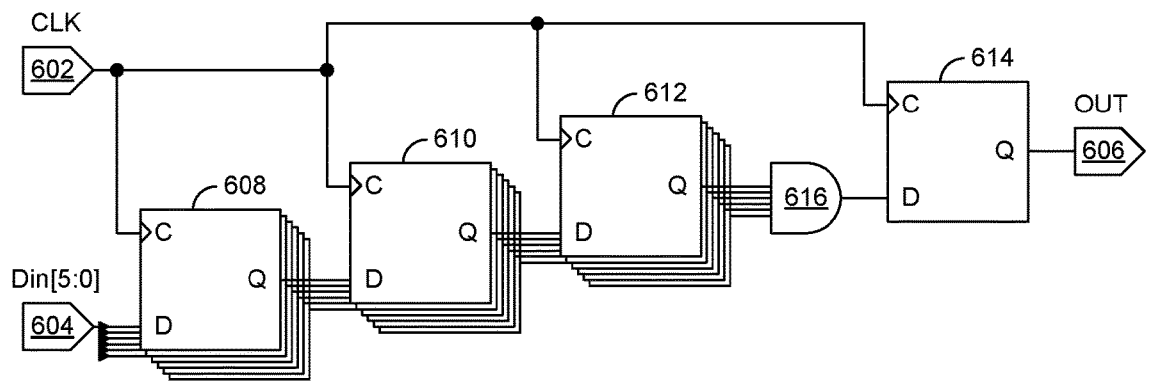
FIGS. 6A and 6B illustrate another example of forward retiming.
Figure 6B:
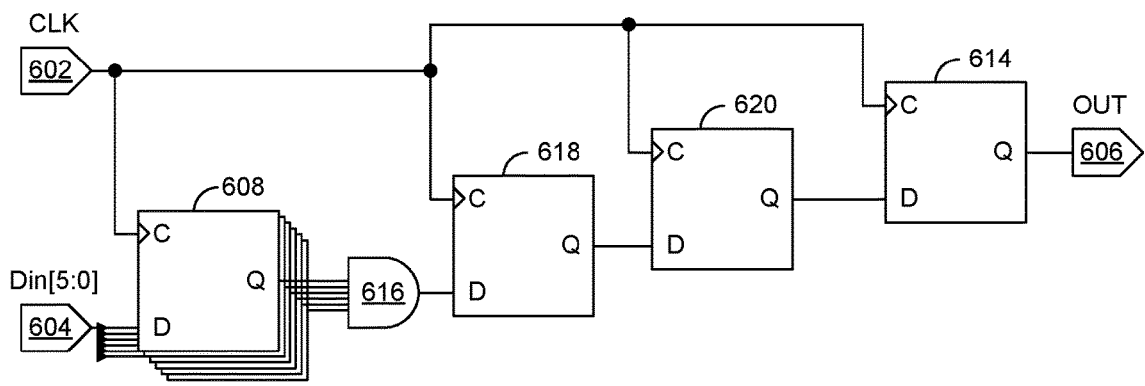

FIGS. 6A and 6B illustrate another example of forward retiming. The forward retiming illustrated in FIGS. 6A and 6B may be performed by a system as described herein implementing the operations described in connection with FIG. 3. The path shown in FIG. 6A has pins 602, 604, and 606. Pin 602 carries the clock (CLK) signal. Pin 604, which carries the signal Din, is a primary input, while pin 606, which carries the OUT signal is a primary output. Since signal Din is a 6-bit signal, each of flip-flops 608, 610, and 612 represents 6 different flip-flops, where each of the 6 different flip-flops 608 processes 1-bit of Din, each of the 6 different flip-flops 610 processes 1-bit of the 6-bit signal output from flip-flops 608, and each of the 6 different flip-flops 612 processes 1-bit of the 6-bit signal output from flip-flops 612. Each output from flip-flops 612 is coupled to an input of AND gate 616. An output of AND gate 616 drives the D input of flip-flop 614. The Q output of flip-flop 614 is coupled to pin 606.

From time-to-time within this disclosure, the inputs of LUTs may also be referred to as input pins of the LUT. The output of a LUT may be referred to as an output pin of the LUT. Similarly, the D input of a flip-flop may be referred to as an input pin of the flip-flop, while the Q output of the flip-flop may be referred to as an output pin of the flip-flop.

The example of FIG. 6A includes 19 flip-flops. Referring to FIG. 6B, the system has performed forward retiming on flip-flops 610 and 612 by creating flip-flops 618 and 620 following AND gate 616. Since the output signal from AND gate 616 is a 1-bit signal, only one instance of the newly created flip-flop 618 and one instance of newly created flip-flop 620 is needed. As such, the flip-flop count drops from 19 in FIG. 6A to 9 in FIG. 6B. The reduction in flip-flops reduces the area required to implement the circuit design and reduces the power consumption of the circuit design.

In the example of FIG. 6A, each of flip-flops 610 and each of flip-flops 612 are marked with the forward retiming tag. The system is capable of detecting flip-flops 610 and 612 as being tagged. For purposes of discussion, processing of flip-flops 612 is described. The system is capable of selecting flip-flops 612 and determining the load of flip-flops 612 as being AND gate 616. The system is capable of traversing backward from each input pin of AND gate 616 until a synchronous circuit element or a primary input is reached. For example, the system traverses, or follows, the signal path from each input pin of AND gate 616 backward until a synchronous circuit element or a primary input is reached. In this example, the system reaches each of flip-flops 612 and adds each of flip-flops 612 to the forward retiming list.

The system determines that since no primary input was reached during the traversing performed (e.g., the forward retiming list does not include a primary input) and each of flip-flops 612 has compatible control pins, the forward retiming criteria is met. Accordingly, the system determines a new type of flip-flop to be inserted and an initial value for the flip-flop. In the example of FIG. 6B, new flip-flop 620 is inserted immediately following AND gate 616. Flip-flops 612 are removed from the path. The system may perform the forward retiming process described with reference to flip-flop 612 again on flip-flops 610 resulting in the removal of flip-flops 610 and the creation of flip-flop 618 immediately following AND gate 616 (between flip-flop 620 and AND gate 616). FIG. 6B illustrates the result from retiming flip-flops 610 and 612.

Figure 7A:
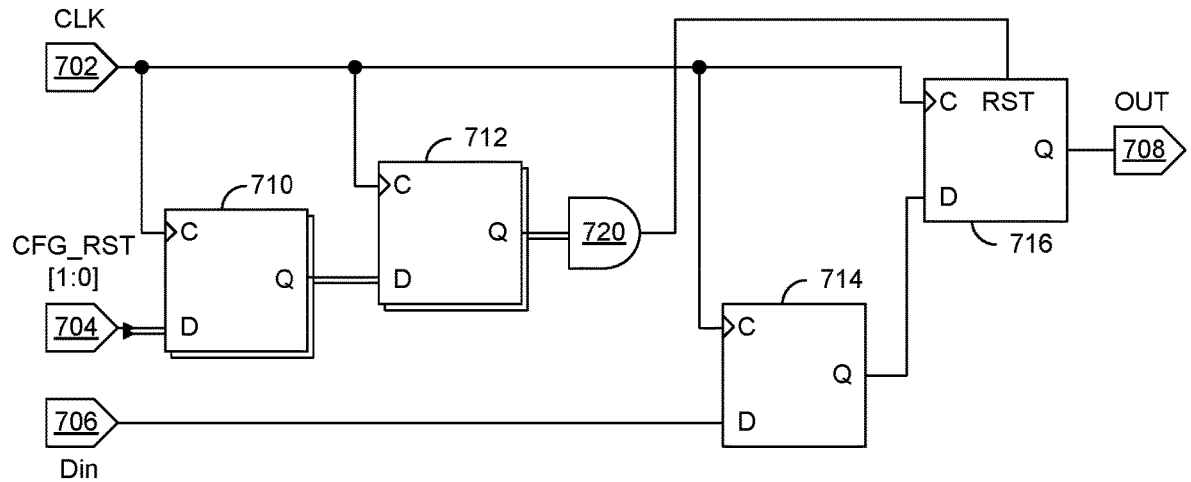
FIGS. 7A and 7B illustrate another example of forward retiming.
Figure 7B:
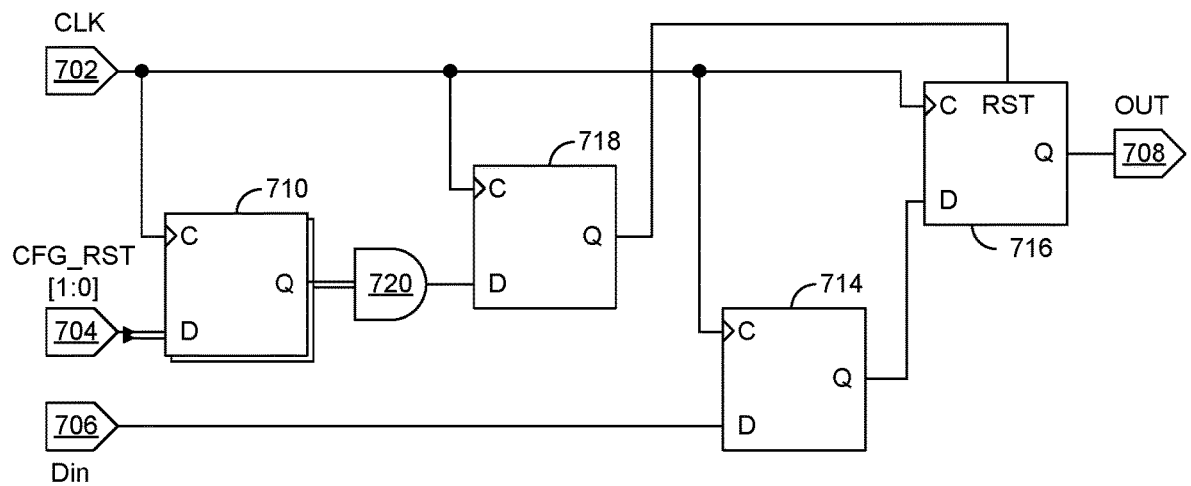

FIGS. 7A and 7B illustrate another example of forward retiming. The forward retiming illustrated in FIGS. 7A and 7B may be performed by a system as described herein implementing the operations described in connection with FIG. 3. The path shown in FIG. 7A has pins 702, 704, 706, and 708. Pin 702 carries the clock (CLK) signal. Pins 704 and 706 are primary inputs, while pin 708 is a primary output. Pin 704 represents a 2-bit signal called CFG_RST [1:0]. Accordingly, each of flip-flops 710 and 712 represents 2 different flip-flops, where each of the 2 different flip-flops 710 processes 1-bit of the 2-bit signal and each of the 2 different flip-flops 712 processes 1-bit of the 2-bit signal output from flip-flop 710. Each output from flip-flops 712 is coupled to an input of AND gate 720. An output of AND gate 720 drives the reset (RST) of flip-flop 716. Pin 706 represents a 1-bit signal called Din that is provided to the D input of flip-flop 714. The Q output of flip-flop 714 drives the D input of flip-flop 716. The Q output of flip-flop 716 is coupled to primary output pin 708, which conveys the OUT signal.

In the example of FIG. 7A, the path includes 6 flip-flops. Referring to FIG. 7B, the system has performed forward retiming of flip-flops 712 to a location following AND gate 720. Since the output signal from AND gate 720 is a 1-bit signal, only one instance of flip-flop 712 is needed. As such, the flip-flop count drops from 6 in FIG. 7A to 5 in FIG. 7B. The reduction in the number of flip-flops reduces the area required to implement the circuit design and reduces the power consumption of the circuit design.

In the example of FIG. 7A, flip-flops 712 are marked with the forward retiming tag. The system is capable of detecting flip-flops 712 as being tagged. The system is capable of selecting flip-flops 712 and determining that AND gate 720 is the load of flip-flops 712. The system is capable of traversing backward from each input pin of AND gate 720 until a synchronous circuit element or a primary input is reached. In this example, the system reaches each of flip-flops 712 and adds each of flip-flops 712 to the forward retiming list.

The system determines that since no primary input was reached during the traversing performed (e.g., no primary input is included on the forward retiming list) and that each of flip-flops 712 has compatible control pins, the forward retiming criteria is met. Accordingly, the system determines a new type of flip-flop to be inserted into the circuit design and inserts new flip-flop 718 as shown in FIG. 7B. Flip-flop 718 is of the determined type. Further, the system determines an initial value for new flip-flop 718 and assigns the initial new value thereto. Flip-flops 712 are removed from the circuit design. FIG. 7B illustrates the result of retiming flip-flops 712 and shows the location and connectivity of new flip-flop 718.

Figure 8A:
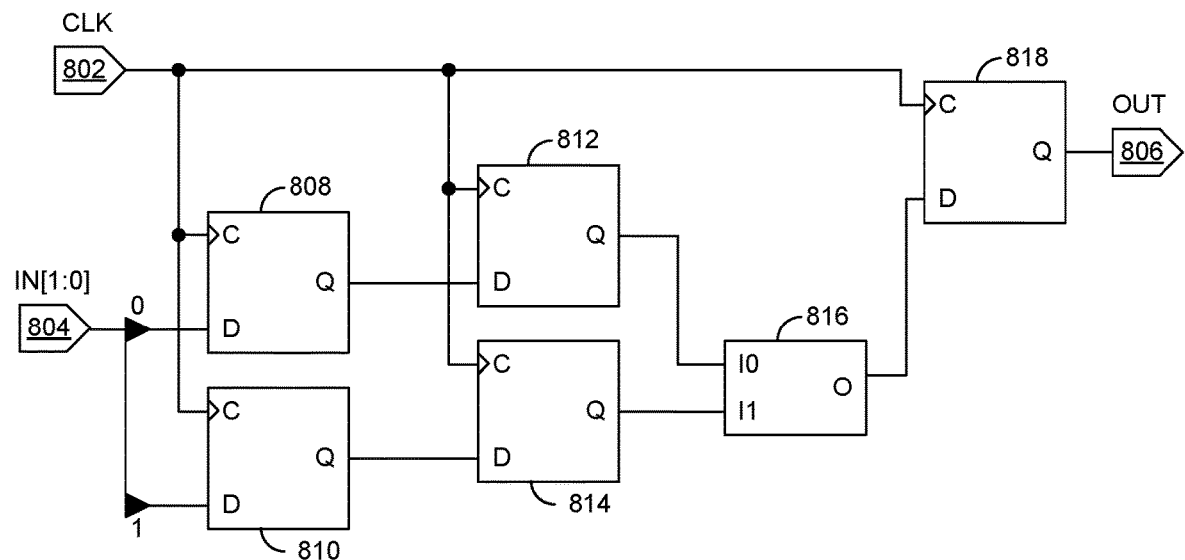
FIGS. 8A and 8B illustrate an example of determining the initial value for a newly inserted synchronous circuit element.
Figure 8B:
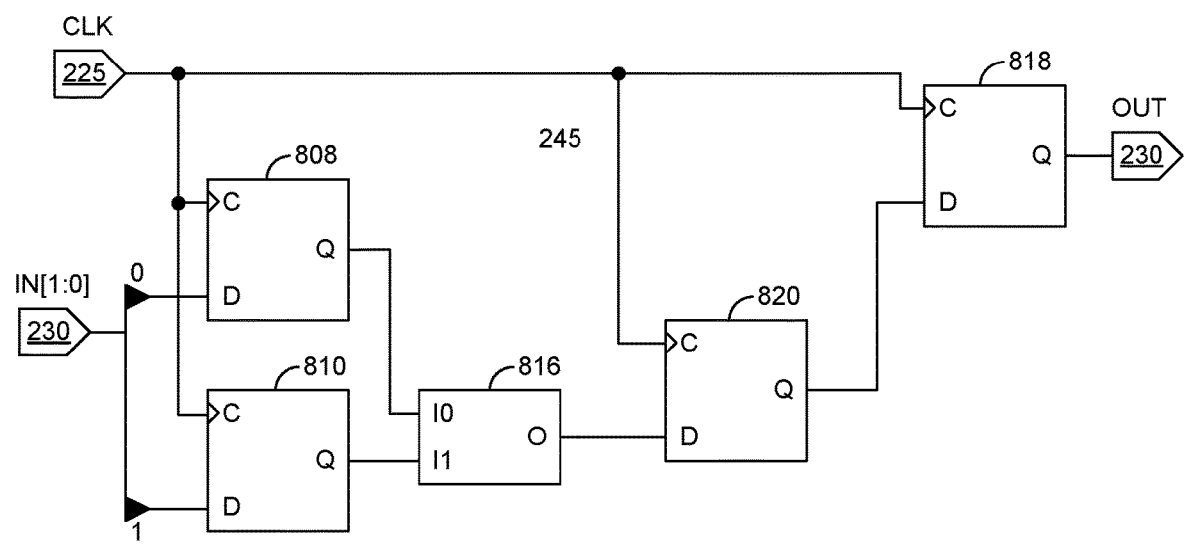

FIGS. 8A and 8B illustrate an example of determining the initial value for a newly inserted synchronous circuit element. The forward retiming illustrated in FIGS. 8A and 8B may be performed by a system as described herein implementing the operations described in connection with FIG. 3. The path shown in FIG. 8A includes pins 802, 804, and 806. Pin 802 carries the clock (CLK) signal. Pin 804 is a primary input, while pin 806 is a primary output. Pin 804 represents a 2-bit signal called IN[1:0]. Pin 806 carries the "OUT" signal. The path includes flip-flops 808, 810, 812, 814, and 818, and LUT 816. For purposes of illustration, flip-flop 814 is marked with the forward retiming tag.

The system is capable of detecting flip-flop 814 as being tagged. The system is capable of selecting flip-flop 814 and determining that the load of flip-flop 814 is LUT 816. The system is capable of traversing backward from each input of LUT 816 until a synchronous circuit element or a primary input is reached. In this example, the system reaches each of flip-flops 812 and 814. The system adds flip-flops 812 and 814 to the forward retiming list.

The system determines that since no primary input was reached during the traversing performed (e.g., the forward retiming list includes no primary input) and that each of flip-flops 812 and 814 has compatible control pins, the forward retiming criteria is met. Accordingly, the system determines a new type of flip-flop to be inserted into the circuit design and inserts new flip-flop 820 as shown in FIG. 8B. Flip-flop 820 is of the determined type. Further, the system determines an initial value for new flip-flop 820 and assigns the initial value thereto. The system removes flip-flops 812 and 814 from the circuit design as shown in FIG. 8B.

In determining the initial value for flip-flop 820, the system is capable of using simulation. The system may evaluate the initial value assigned to the flip-flops on the forward retiming list that are to be removed from the circuit design. In this example, the system determines the initial value for flip-flop 812 and the initial value for flip-flop 814. For purposes of illustration, the initial value of flip-flop 812 is 0 and the initial value of flip-flop 814 is also 0. LUT 816 implements a NAND gate function. Since the output from LUT 816 in FIG. 8A is 1 initially, the initial value determined for flip-flop 820 is 1, e.g., the value determined for the output of the circuit element that drives newly inserted flip-flop 820.

Figure 9A:
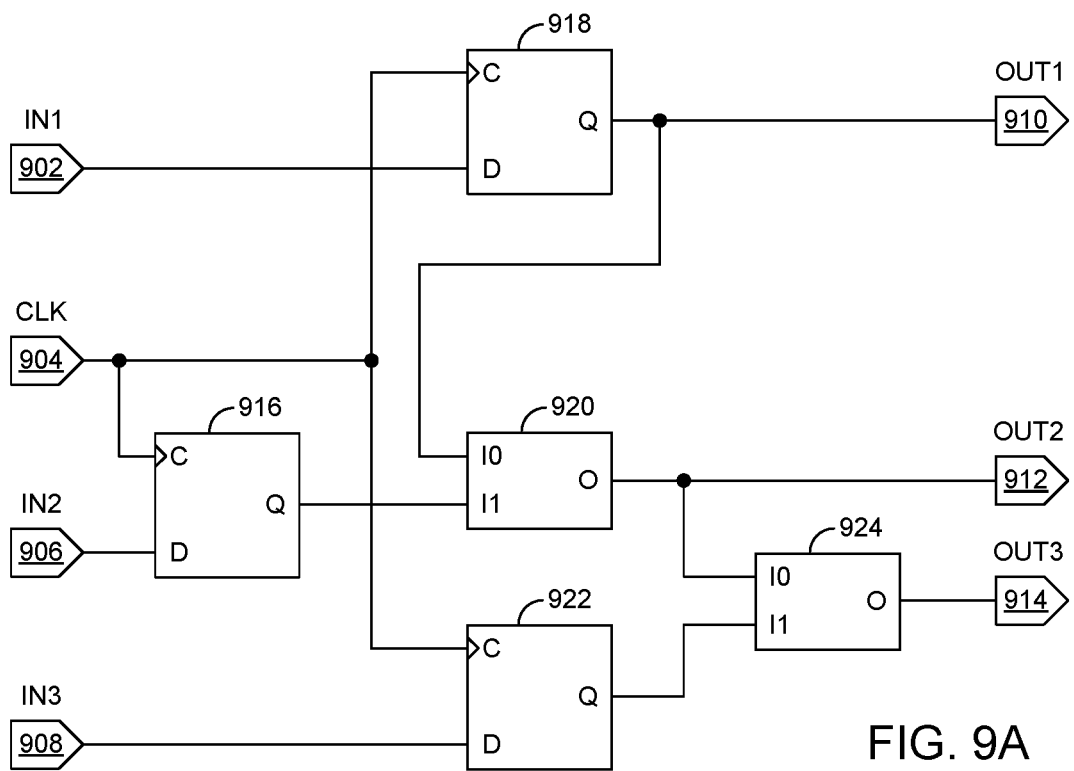
FIGS. 9A and 9B illustrate another example of forward retiming.
Figure 9B:
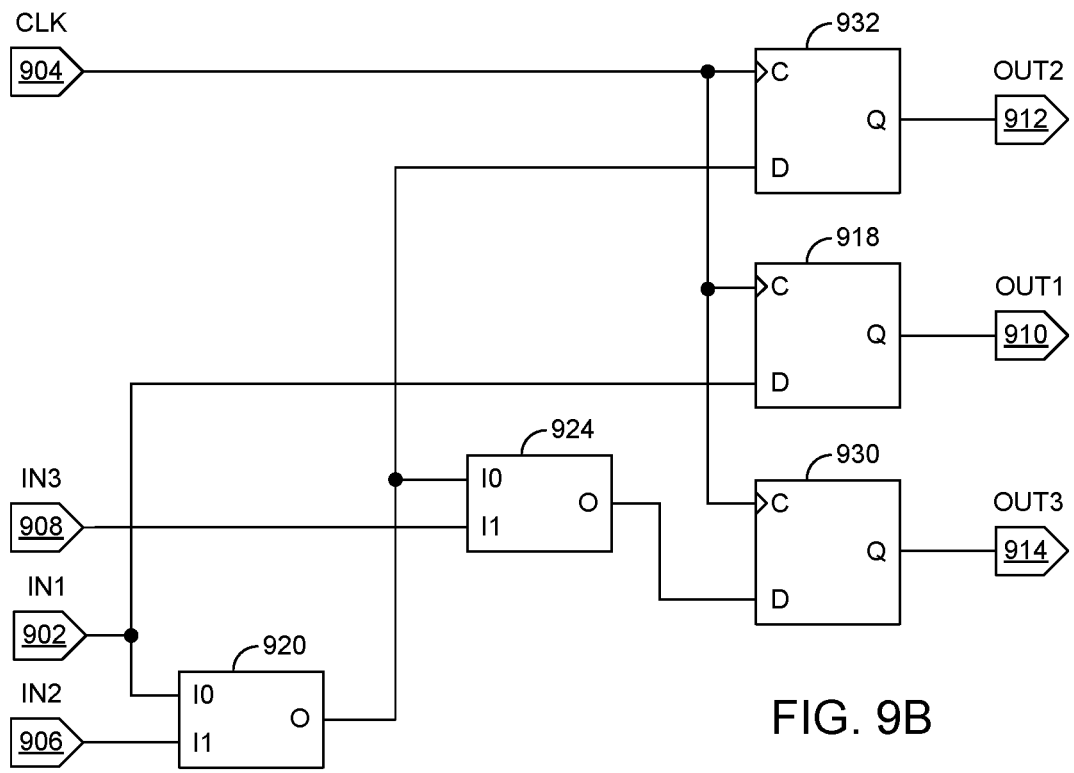

FIGS. 9A and 9B illustrate another example of forward retiming. The forward retiming illustrated in FIGS. 9A and 9B may be performed by a system as described herein implementing the operations described in connection with FIG. 3. The path shown in FIG. 9A includes pins 902, 904, 906, 908, 910, 912, and 914. Pin 904 carries the clock signal (CLK). Pins 902, 906, and 908 are primary inputs and carry signals IN1, IN2, and IN3, respectively. Pins 910, 912, and 914 are primary outputs and carry signals OUT1, OUT2, and OUT3, respectively. In the example of FIG. 9A, flip-flop 922 is marked with the forward retiming tag.

Accordingly, the system is capable of determining that LUT 924 is the load of flip-flop 922. Having identified LUT 924 as the load, the system traverses the circuit design backward from each input pin of LUT 924. Accordingly, the system traverses backward from input I1 of LUT 924 to output Q of flip-flop 922. The system traverses backward from input I0 of LUT 924 to output O of LUT 920 and from input I0 of LUT 920 to output Q of flip-flop 918. The system further traverses backward from input I1 of LUT 920 to output Q of flip-flop 916. As discussed, the system stops traversing down different signal paths in response to encountering a synchronous circuit element or a primary input. Each synchronous circuit element and/or primary input encountered during the traversing is added to the forward retiming list.

In performing the traversal described, the system is capable of tracking each pin that is visited and each circuit element that is visited during the traversal. For example, the system marks each of the following pins: input I1 of LUT 924, output Q of flip-flop 922, input I0 of LUT 924, output O of LUT 920, input I0 of LUT 920, output Q of flip-flop 918, input I1 of LUT 920, and output Q of flip-flop 916 as "visited." Further, the system adds each of flip-flops 916, 918, and 922 to the forward retiming list. The instances of combinatorial logic, e.g., LUTs, visited during the traversal include LUT 920 and LUT 924.

The system determines that each of flip-flops 916, 918, and 922 have compatible control pins and that no primary input was reached during the traversal operation (e.g., no primary input is included on the forward retiming list). As such, the system determines that the forward retiming criteria is met.

Referring to FIG. 9B, the system determines the type of flip-flops to be added to the circuit design and the initial value of each. The system creates a flip-flop 930 at the output of the load, e.g., at the output of LUT 924. The system further creates a flip-flop at the output of each visited instance of combinatorial logic, other than the load, that has at least one unvisited pin. In the example of FIG. 9A, LUT 920 was visited during the traversal and has an unvisited load, which is pin 912. As such, in FIG. 9B, the system creates flip-flop 932 between the output O of LUT 920 and pin 912.

The system is further capable of removing selected ones of the flip-flops on the forward retiming list from the circuit design. In one or more embodiments, the system removes the flip-flop as follows: for each visited load pin driven by the Q pin of a flip-flop on the forward retiming list, the system connects the Q pin of the flip-flop to the D input of the flip-flop. This operation effectively shorts out each such flip-flop thereby removing the flip-flops 916 and 922 from the circuit design. In this example, since flip-flop 918 drives pin 910, which was not visited, flip-flop 918 remains within the circuit design. Subsequent to the operations described resulting in the retimed path shown in FIG. 9B, the system clears the pins marked as visited. The system further clears the forward retiming list and any tracked circuit elements from the traversal previously performed.

Figure 10A:
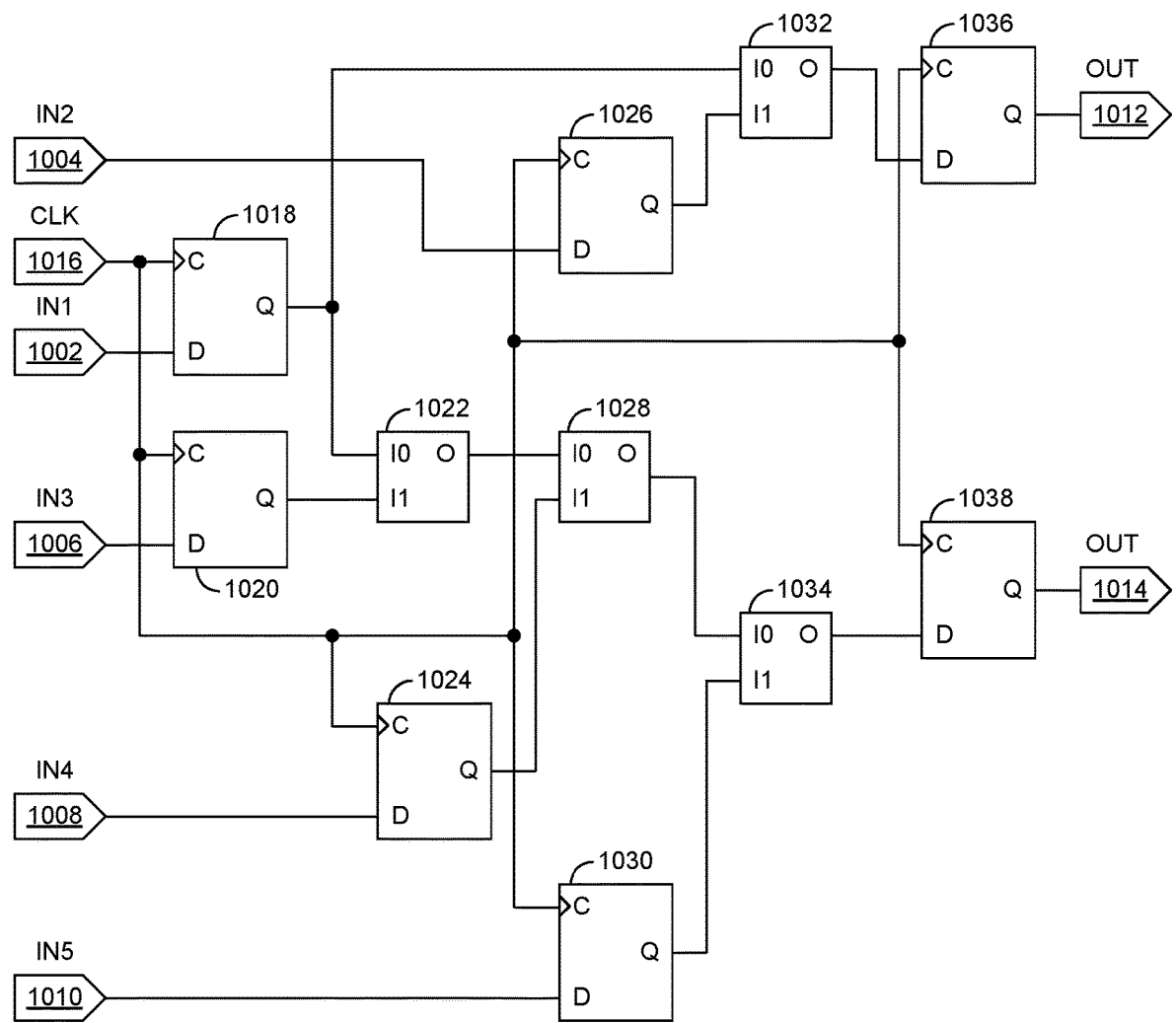
FIGS. 10A, 10B, and 10C illustrates another example of forward retiming.
Figure 10B:
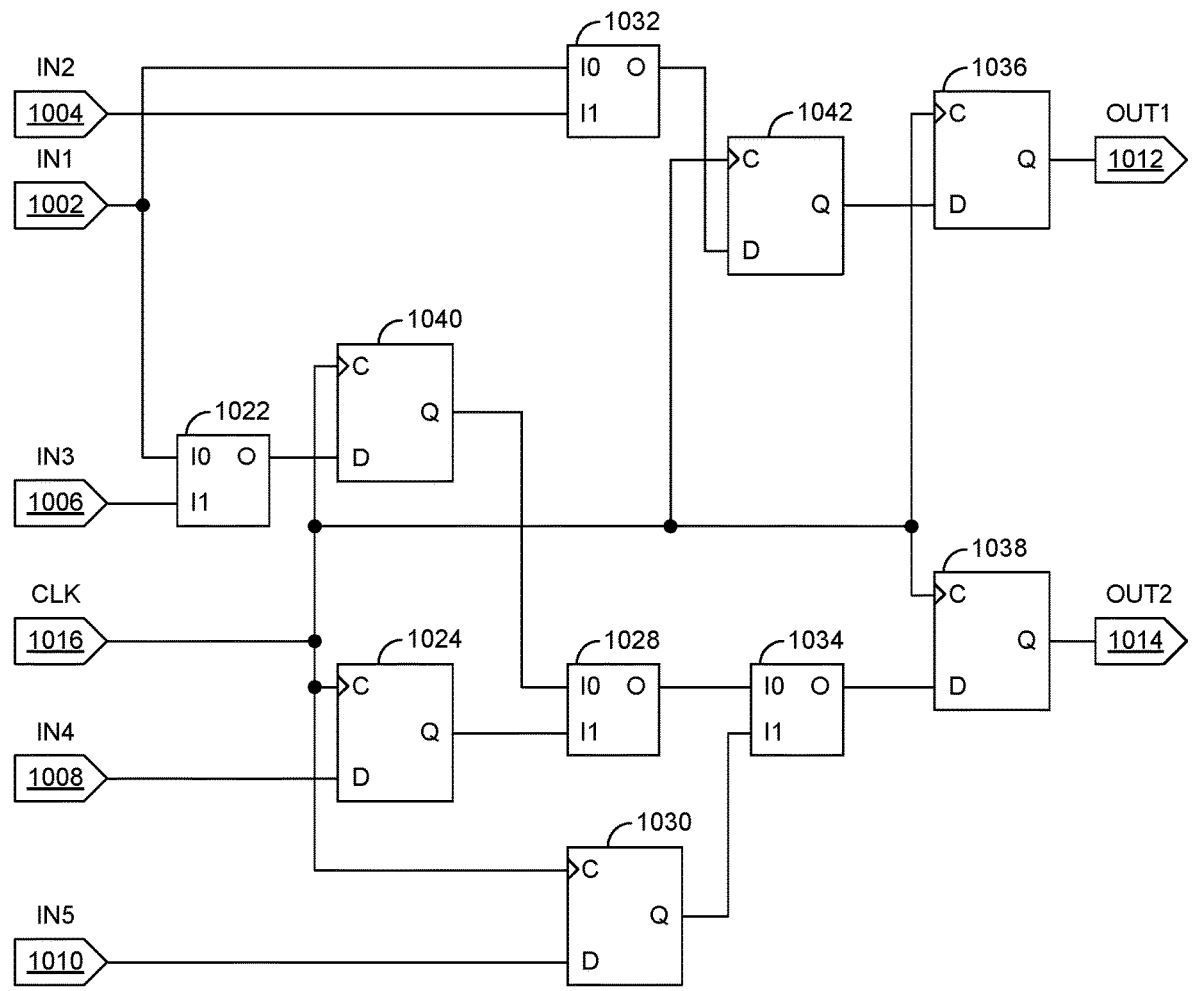
Figure 10C:
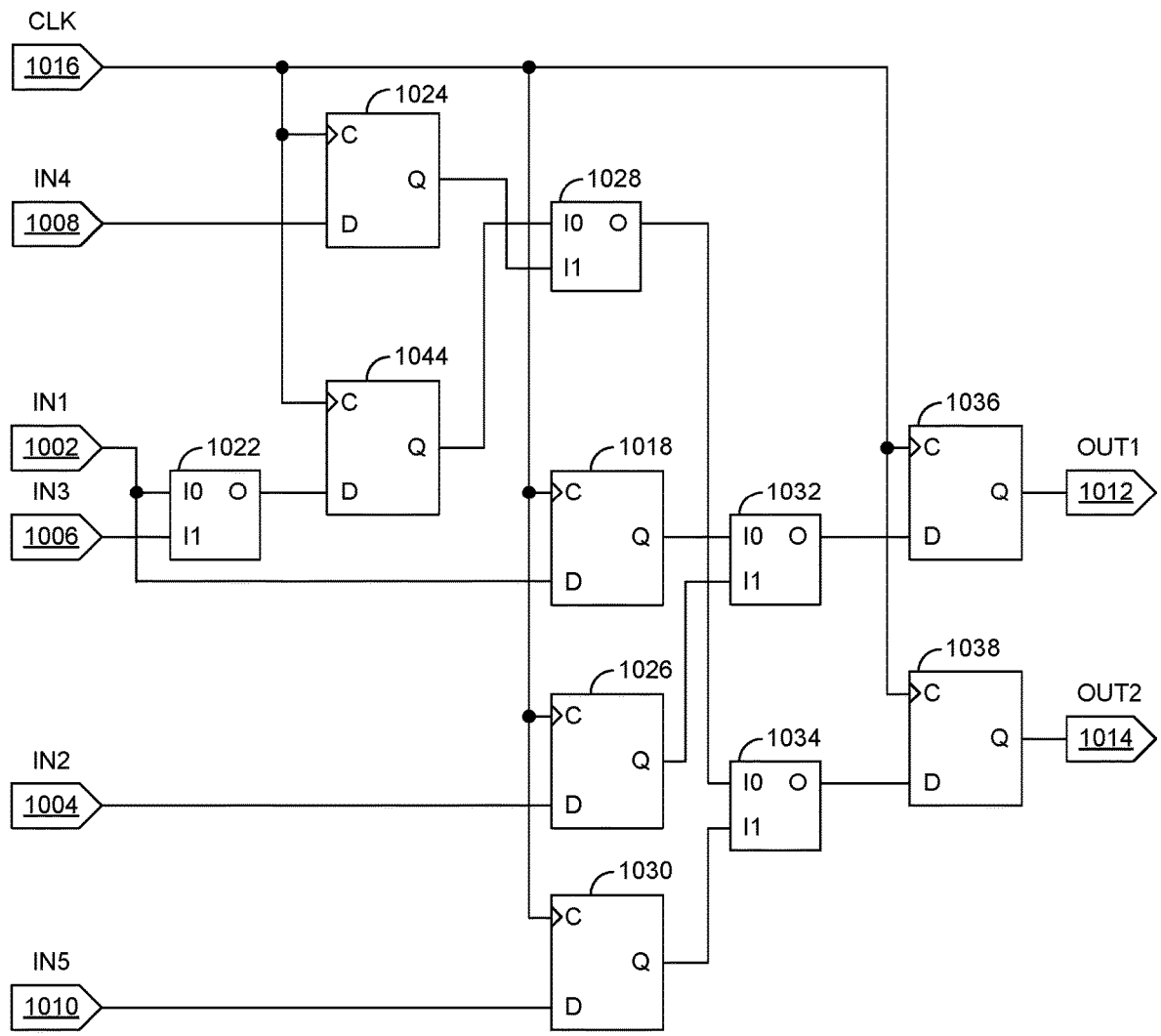

FIGS. 10A, 10B, and 10C illustrates another example of forward retiming. The forward retiming illustrated in FIGS. 10A and 10B, and 10C may be performed by a system as described herein implementing the operations described in connection with FIG. 3. FIG. 10C illustrates another embodiment of forward retiming where fewer than all loads of a marked flip-flop are retimed. The path shown in FIG. 10A includes pins 1002, 1004, 1006, 1008, 1010, 1012, 1014, and 1016. Pins 1002, 1004, 1006, 1008, and 1010 are primary inputs and carry signals IN1, IN2, IN3, IN4, and IN5, respectively. Pins 1012 and 1014 are primary outputs and carry signals OUT1 and OUT2, respectively. Pin 1016 carries the clock signal (CLK). In the example of FIG. 10A, flip-flop 1018 is marked with the forward retiming tag.

Accordingly, the system is capable of determining that LUTs 1022 and 1032 are the loads of flip-flop 1018. Having identified LUTs 1022 and 1032 as the loads, the system traverses the circuit design backward from each input pin of LUT 1022 and each input pin of LUT 1032. The system traverses backward from input I0 of LUT 1032 to output Q of flip-flop 1018. The system traverses backward from input I1 of LUT 1032 to output Q of flip-flop 1026. The system traverses backward from input I0 of LUT 1022 to output Q of flip-flop 1018. The system further traverses backward from input I1 of LUT 1022 to output Q of flip-flop 1020. As discussed, the system stops traversing down different signal paths in response to encountering a synchronous circuit element or a primary input. Each synchronous circuit element and/or primary input encountered during the traversing is added to the forward retiming list.

In performing the traversal described, the system is capable of tracking each pin that is visited and each circuit element that is visited during the traversal. For example, the system marks each of the following pins: input I0 and input i1 of LUT 1032, output Q of flip-flop 1026, output Q of flip-flop 1018, input I0 and input I1 of LUT 1022, and output Q of flip-flop 1020 as "visited." Further, the system adds each of flip-flops 1026, 1018, and 1020 to the forward retiming list. The instances of combinatorial logic, e.g., LUTs, visited during the traversal include LUTs 1032 and 1022.

The system determines that each of flip-flops 1026, 1018, and 1020 have compatible control signals and that no primary input was reached during the traversal operation (e.g., no primary input is included on the forward retiming list). As such, the system determines that the forward retiming criteria is met.

Referring to FIG. 10B, the system determines the type of flip-flops to be added to the circuit design and the initial value of each. The system creates a flip-flop 1040 at the output of the load, e.g., at the output of LUT 1022, and a flip-flop 1042 at the output of the other load, e.g., at the output of LUT 1032. In this example, there are no visited instances of combinatorial logic other than the loads. As such, no further flip-flops are created.

The system is further capable of removing selected flip-flops on the forward retiming list from the circuit design. In one or more embodiments, the system removes flip-flops as follows: for each visited load pin driven by the Q pin of a flip-flop on the forward retiming list, the system connects the Q pin of the flip-flop to the D input of the flip-flop. This operation effectively shorts out each such flip-flop thereby removing the flip-flops 1018, 1020, and 1026 from the circuit design. Subsequent to the operations described resulting in the retimed path shown in FIG. 10B, the system clears the pins marked as visited. The system further clears the forward retiming list and any tracked circuit elements from the traversal previously performed.

FIG. 10C illustrates an example where flip-flop 1018 is marked with the forward retiming tag. In the example of FIG. 10C, the retiming tag has a further property indicating that the forward retiming is to be performed only along the path corresponding to load of LUT 1022. Referring again to FIG. 10A, the system is capable of determining that LUT 1022 is the load of flip-flop 1018. LUT 1032 is ignored in this analysis due to the property specified by the tag. Having identified LUT 1022 as the load, the system traverses the circuit design backward from each input pin of LUT 1022. The system traverses backward from input I0 of LUT 1022 to output Q of flip-flop 1018. The system further traverses backward from input I1 of LUT 1022 to output Q of flip-flop 1020. As discussed, the system stops traversing down different signal paths in response to encountering a synchronous circuit element or a primary input. Each synchronous circuit element and/or primary input encountered during the traversing is added to the forward retiming list.

In performing the traversal described, the system is capable of tracking each pin that is visited and each circuit element that is visited during the traversal. For example, the system marks each of the following pins: input I0 and input I1 of LUT 1022 and output Q of flip-flop 1020 as "visited." Further, the system adds each of flip-flops 1018 and 1020 to the forward retiming list. The instances of combinatorial logic, e.g., LUTs, visited during the traversal include LUT 1022.

The system determines that each of flip-flops 1018 and 1020 have compatible control signals and that no primary input was reached during the traversal operation (e.g., no primary input is included on the forward retiming list). As such, the system determines that the forward retiming criteria is met.

Referring again to FIG. 10C, the system determines the type of flip-flops to be added to the circuit design and the initial value of each. The system creates a flip-flop 1044 at the output of the load, e.g., at the output of LUT 1022. In this example, there are no visited instances of combinatorial logic other than the loads. As such, no further flip-flops are created.

The system is further capable of removing selected flip-flops on the forward retiming list from the circuit design. In one or more embodiments, the system removes flip-flops as follows: for each visited load pin driven by the Q pin of a flip-flop on the forward retiming list, the system connects the Q pin of the flip-flop to the D input of the flip-flop. This operation effectively shorts out flip-flop 1020 thereby removing the flip-flop from the circuit design and leaves flip-flop 1018 within the circuit design to drive LUT 1032. Flip-flop 1018 has a load pin (input I0 of LUT 1032) that is not marked as visited. Subsequent to the operations described resulting in the retimed path shown in FIG. 10C, the system clears the pins marked as visited. The system further clears the forward retiming list and any tracked circuit elements from the traversal previously performed.

Figure 11A:
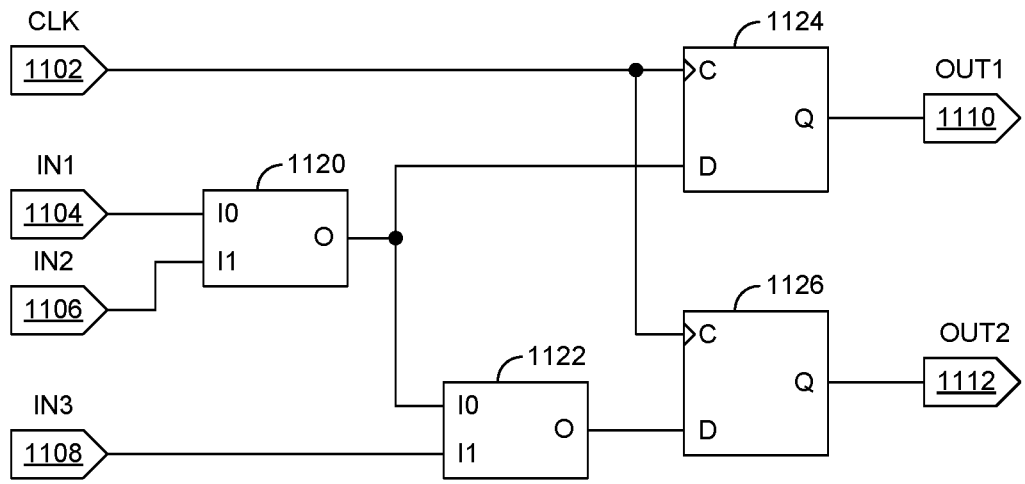
FIGS. 11A and 11B illustrate an example of backward retiming.
Figure 11B:
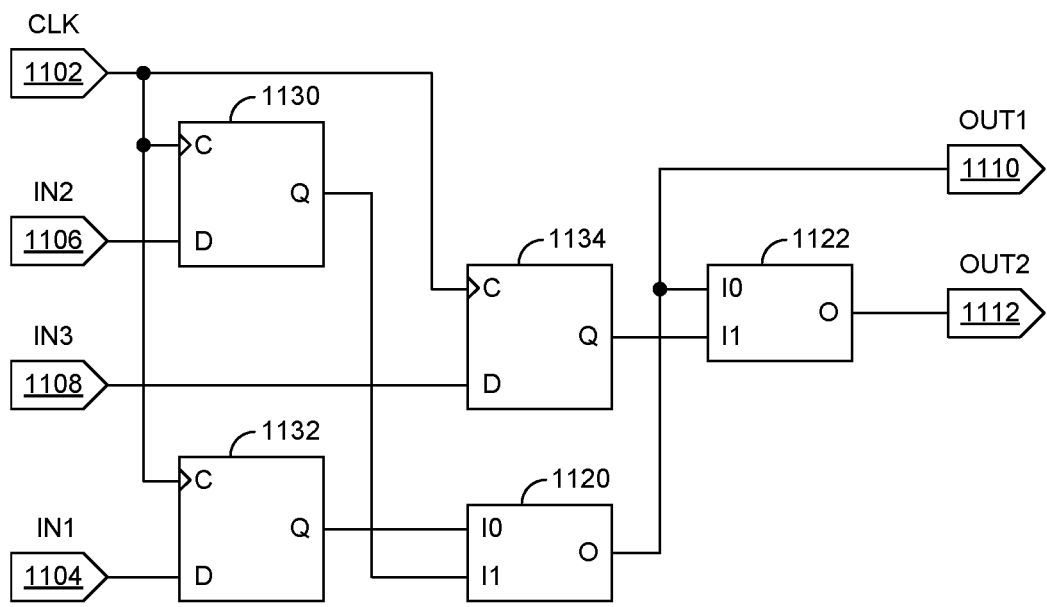

FIGS. 11A and 11B illustrate an example of backward retiming. The backward retiming illustrated in FIGS. 11A and 11B may be performed by a system as described herein implementing the operations described in connection with FIG. 4. The path shown in FIG. 11A includes pins 1102, 1104, 1106, 1108, 1110, and 1112. Pin 1102 carries the clock signal (CLK). Pins 1104, 1106, and 1108 are primary inputs and carry signals IN1, IN2, and IN3, respectively. Pins 1110 and 1112 are primary outputs and carry signals OUT1 and OUT2, respectively. In the example of FIG. 11A, flip-flop 1124 is marked with the backward retiming tag.

Accordingly, the system is capable of detecting flip-flop 1124 and determining that LUT 1120 is the driver of flip-flop 1124. Having identified LUT 1120 as the driver, the system traverses the circuit design forward from the output pin of LUT 1120. The system traverses forward, or follows the signal path, from output O of LUT 1120 to input D of flip-flop 1124. The system also traverses forward, or follows the signal path, from output O of LUT 1120 to input I0 of LUT 1122 and from output O of LUT 1122 to input D of flip-flop 1126. The system is capable of continuing down each signal until a synchronous circuit element is reached or a primary output is reached. Each synchronous circuit element and/or primary output that is encountered is added to the backward retiming list.

In performing the traversal, the system is capable of tracking each pin of the circuit design that is visited and each circuit element of the circuit design that is visited. The system marks each of the following pins as visited: output O of LUT 1120, input D of flip-flop 1124, input I0 of LUT 1122, output O of LUT 1122, and input D of flip-flop 1126. The visited circuit elements of the circuit design are LUT 1120, LUT 1122, flip-flop 1124, and flip-flop 1126. Further, the system adds each of flip-flops 1124 and 1126 to the backward retiming list.

The system determines that each of flip-flops 1124 and 1126 on the backward retiming list have compatible control pins and that no primary output was reached during the traversal operation (e.g., no primary output is on the backward retiming list). As such, the system determines that the backward retiming criteria is met. The system may determine the new flip-flop type and initial value(s) for such flip-flops. As noted, the system may use ATPG to determine the initial value for any new flip-flop.

Referring to FIG. 11B, the system creates a new flip-flop 1130 and a new flip-flop 1132 each at an input of the driver, e.g., LUT 1120, of marked flip-flop 1124 (removed in FIG. 11B). Flip-flops 1130 and 1132 are each of the type previously determined and have the initial value that was previously determined. The system further creates flip-flops at unvisited input pins of a visited combinatorial circuit element. The flip-flop is of the type previously determined and has an initial value as previously determined. In the example of FIG. 11B, the system creates flip-flop 1134 at input I1 of LUT 1122 (where input I1 of LUT 1122 is an unvisited input pin of a visited circuit element (LUT 1122) during the traversing).

The system is further capable of removing each of the flip-flops on the backward retiming list from the circuit design. For each flip-flop on the backward retiming list, the system connects each of the pins driven by the Q output (pin) of the flip-flop to the D input (pin) of the flip-flop. In the example of FIG. 11B, this operation short circuits flip-flops 1124 and 1126, thereby removing both flip-flops from the circuit design. FIG. 11B illustrates the state of the circuit design after backward retiming.

Figure 12A:
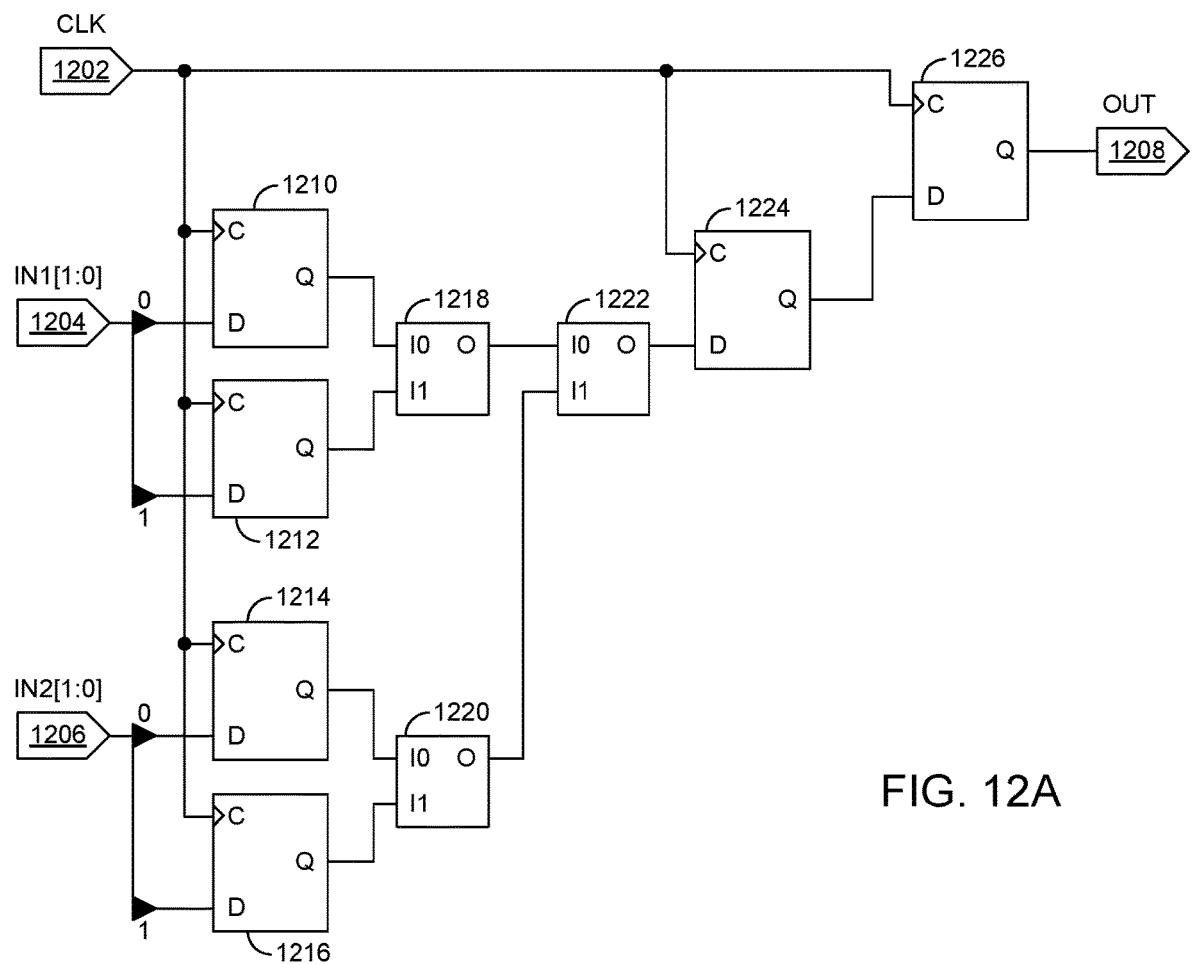
FIGS. 12A and 12B illustrate another example of backward retiming.
Figure 12B:
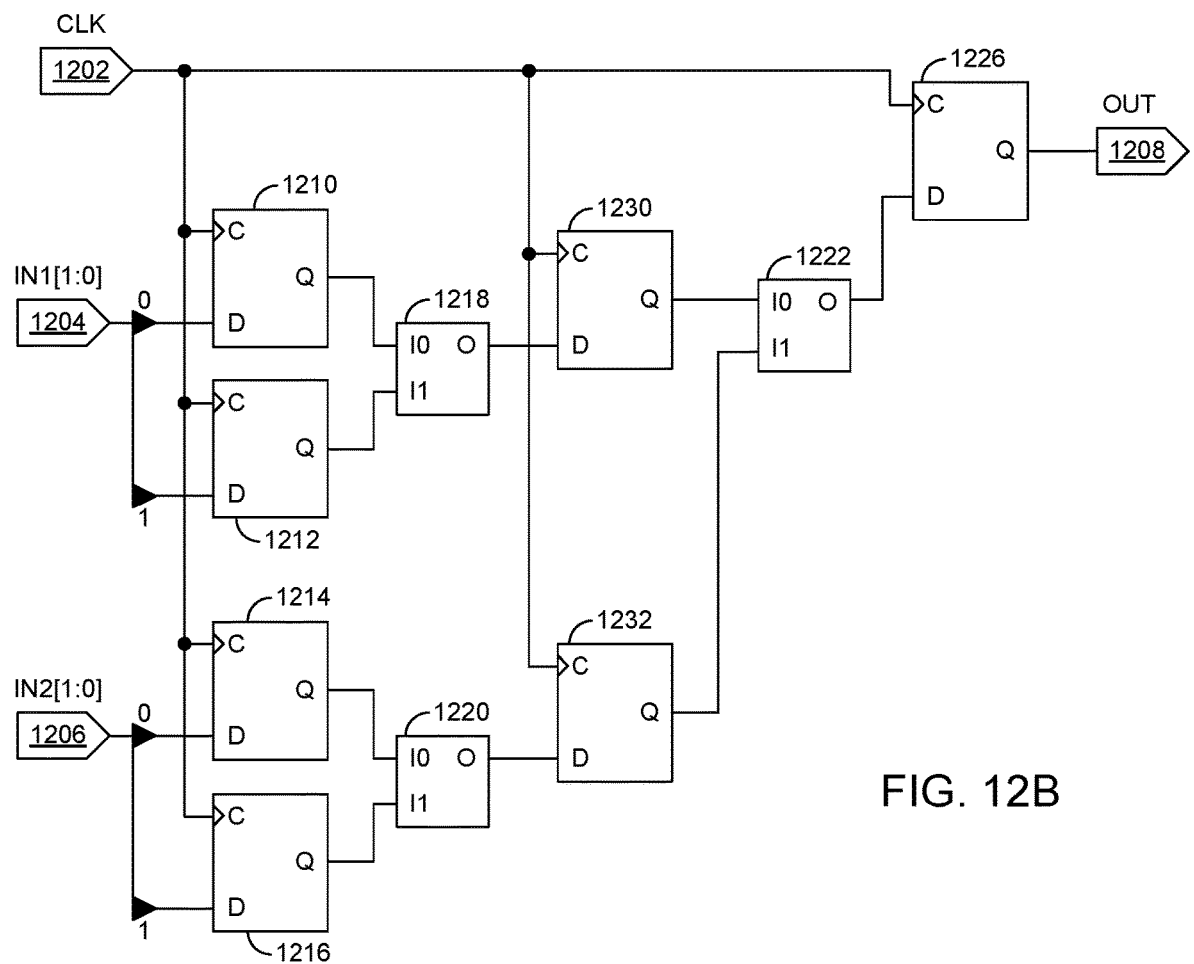

FIGS. 12A and 12B illustrate another example of backward retiming. The backward retiming illustrated in FIGS. 12A and 12B may be performed by a system as described herein implementing the operations described in connection with FIG. 4. The path shown in FIG. 12A includes pins 1202, 1204, 1206, and 1208. Pin 1202 carries the clock signal (CLK). Pins 1204 and 1206 are primary inputs and carry signals IN1 and IN2, respectively. Pin 1208 is a primary output and carries signal OUT. In the example of FIG. 12A, flip-flop 1224 is marked with the backward retiming tag.

Accordingly, the system is capable of detecting flip-flop 1224 and determining that LUT 1222 is the driver of flip-flop 1224. Having identified LUT 1222 as the driver, the system traverses the circuit design forward from the output pin of LUT 1222. As discussed, whether traversing forward or backward, the system is capable of tracking each visited pin and each visited circuit element encountered during the traversal. Accordingly, the system traverses forward from output O of LUT 1222 to input D of flip-flop 1224. The system marks each of the following pins as visited: output O of LUT 1222 and input D of flip-flop 1224. The visited circuit elements of the circuit design are LUT 1222 and flip-flop 1224. Further, the system adds flip-flop 1224 to the backward retiming list. The system continues traversing each signal path until a synchronous circuit element or a primary output is reached.

Since the backward retiming list includes only one flip-flop, the system determines that each flip-flop on the backward retiming has compatible control pins. Further, the system determines that no primary output was reached during the traversal operation since the backward retiming list includes no primary outputs. As such, the system determines that the backward retiming criteria is met. The system may determine the new flip-flop type and initial value(s) for such flip-flops.

Referring to FIG. 12B, the system creates a flip-flop 1230 and a flip-flop 1232 each at an input of the driver, e.g., LUT 1222, of marked flip-flop 1224 (removed in FIG. 12B). Flip-flops 1230 and 1232 are each the type previously determined and have the initial value that was previously determined. While the system further creates flip-flops at the input of the unvisited input pins of each visited circuit element, this operation is not applicable in the example of FIG. 12B since there are no unvisited input pins of a visited circuit element.

The system is capable of removing each of the flip-flops on the backward retiming list from the circuit design. For example, for each flip-flop on the backward retiming list, e.g., flip-flop 1224, the system connects each pin driven by the Q output (pin) of the flip-flop to the D input (pin) of the flip-flop. In the example of FIG. 12B, this operation short circuits flip-flop 1224, thereby removing flip-flop 1224 from the circuit design. FIG. 12B illustrates the state of the circuit design after backward retiming.

Figure 13:
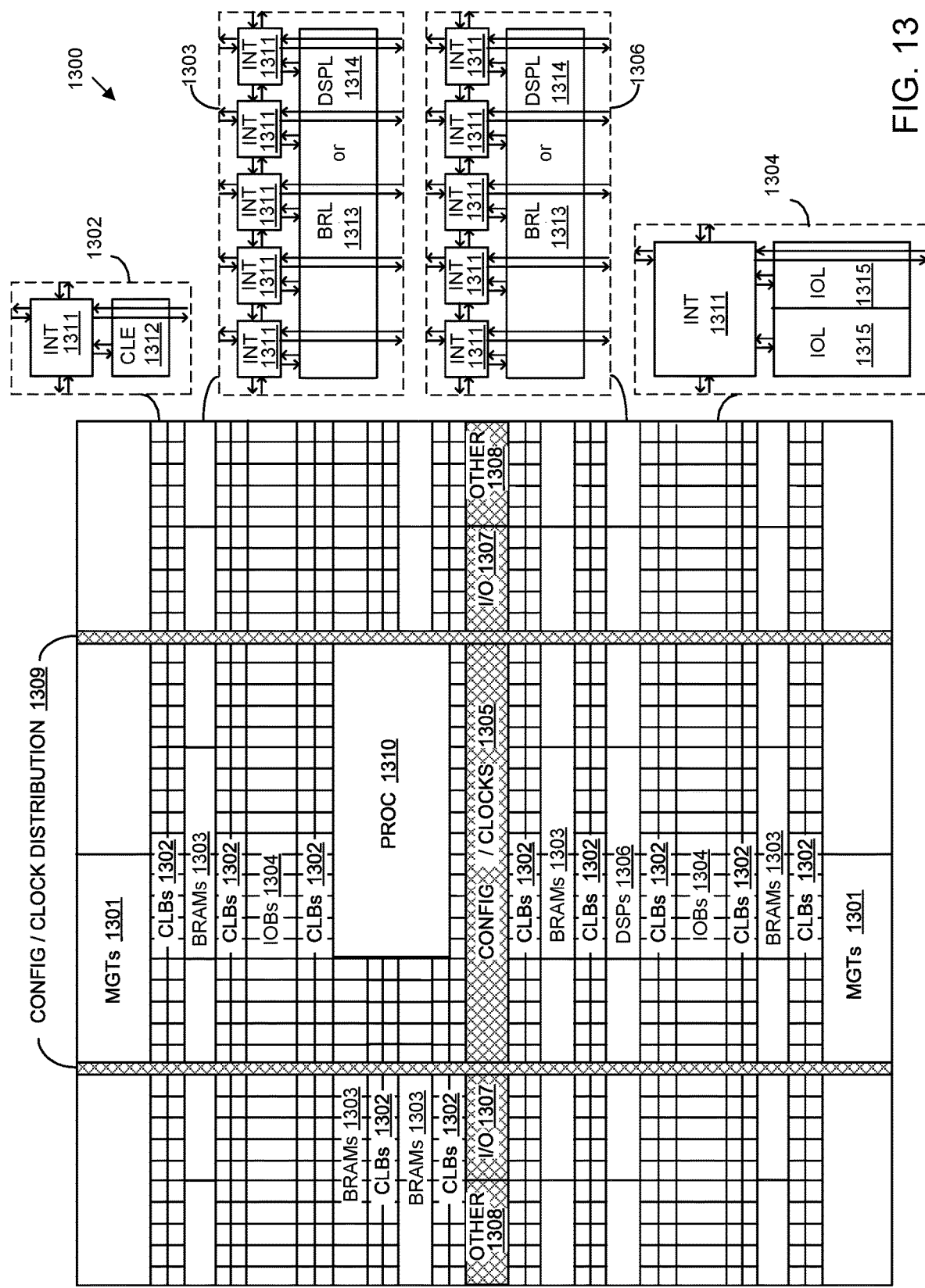
FIG. 13 illustrates an example architecture for an integrated circuit (IC).

FIG. 13 illustrates an example architecture 1300 for an IC. In one aspect, architecture 1300 may be implemented within a programmable IC. For example, architecture 1300 may be used to implement a field programmable gate array (FPGA). Architecture 1300 may also be representative of a system-on-chip (SOC) type of IC. An SOC is an IC that includes a processor that executes program code and one or more other circuits. The other circuits may be implemented as hardwired circuitry, programmable circuitry, and/or a combination thereof. The circuits may operate cooperatively with one another and/or with the processor.

As shown, architecture 1300 includes several different types of programmable circuit, e.g., logic, blocks. For example, architecture 1300 may include a large number of different programmable tiles including multi-gigabit transceivers (MGTs) 1301, configurable logic blocks (CLBs) 1302, random access memory blocks (BRAMs) 1303, input/output blocks (IOBs) 1304, configuration and clocking logic (CONFIG/CLOCKS) 1305, digital signal processing blocks (DSPs) 1306, specialized I/O blocks 1307 (e.g., configuration ports and clock ports), and other programmable logic 1308 such as digital clock managers, analog-to-digital converters, system monitoring logic, and so forth.

In some ICs, each programmable tile includes a programmable interconnect element (INT) 1311 having standardized connections to and from a corresponding INT 1311 in each adjacent tile. Therefore, INTs 1311, taken together, implement the programmable interconnect structure for the illustrated IC. Each INT 1311 also includes the connections to and from the programmable logic element within the same tile, as shown by the examples included at the top of FIG. 13.

For example, a CLB 1302 may include a configurable logic element (CLE) 1312 that may be programmed to implement user logic plus a single INT 1311. A BRAM 1303 may include a BRAM logic element (BRL) 1313 in addition to one or more INTs 1311. Typically, the number of INTs 1311 included in a tile depends on the height of the tile. As pictured, a BRAM tile has the same height as five CLBs, but other numbers (e.g., four) also may be used. A DSP tile 1306 may include a DSP logic element (DSPL) 1314 in addition to an appropriate number of INTs 1311. An 1OB 1304 may include, for example, two instances of an I/O logic element (IOL) 1315 in addition to one instance of an INT 1311. The actual I/O pads connected to IOL 1315 may not be confined to the area of IOL 1315.

In the example pictured in FIG. 13, a columnar area near the center of the die, e.g., formed of regions 1305, 1307, and 1308, may be used for configuration, clock, and other control logic. Horizontal areas 1309 extending from this column may be used to distribute the clocks and configuration signals across the breadth of the programmable IC.

Some ICs utilizing the architecture illustrated in FIG. 13 include additional logic blocks that disrupt the regular columnar structure making up a large part of the IC. The additional logic blocks may be programmable blocks and/or dedicated circuitry. For example, a processor block depicted as PROC 1310 spans several columns of CLBs and BRAMs.

In one aspect, PROC 1310 may be implemented as dedicated circuitry, e.g., as a hardwired processor, that is fabricated as part of the die that implements the programmable circuitry of the IC. PROC 1310 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 1310 may be omitted from architecture 1300 and replaced with one or more of the other varieties of the programmable blocks described. Further, such blocks may be utilized to form a "soft processor" in that the various blocks of programmable circuitry may be used to form a processor that can execute program code as is the case with PROC 1310.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 13 that are external to PROC 1310 such as CLBs 1302 and BRAMs 1303 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 1310.

In some instances, hardwired circuitry may have one or more operational modes that can be set or selected according to flip-flop settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SOC, the configuration bitstream may specify the circuitry that is to be implemented within the programmable circuitry and the program code that is to be executed by PROC 1310 or a soft processor. In some cases, architecture 1300 includes a dedicated configuration processor that loads the configuration bitstream to the appropriate configuration memory and/or processor memory. The dedicated configuration processor does not execute user-specified program code. In other cases, architecture 1300 may utilize PROC 1310 to receive the configuration bitstream, load the configuration bitstream into appropriate configuration memory, and/or extract program code for execution.

FIG. 13 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 13 are purely illustrative. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 1310 within the IC are for purposes of illustration only and are not intended as limitations.

Architecture 1300 of FIG. 13 is an example of an IC in which a circuit design processed as described herein may be implemented. For example, a circuit design may be synthesized, processed through forward and/or backward retiming as described here, and undergo further operations of a design flow such as placement, routing, and/or bitstream generation for implementation within an IC having an architecture the same as or similar to that of FIG. 13.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the terms "one embodiment," "an embodiment," "one or more embodiments," "particular embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments," "in particular embodiments," and similar language throughout this disclosure may, but do not necessarily, all refer to the same embodiment. The terms "embodiment" and "arrangement" are used interchangeably within this disclosure.

As defined herein, the term "processor" means at least one hardware circuit. The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), an FPGA, a programmable logic array (PLA), an ASIC, programmable logic circuitry, and a controller.

As defined herein, the term "output" means storing in physical memory elements, e.g., devices, writing to display or other peripheral output device, sending or transmitting to another system, exporting, or the like.

As defined herein, the term "real time" means a level of processing responsiveness that a user or system senses as sufficiently immediate for a particular process or determination to be made, or that enables the processor to keep up with some external process.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forward the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

In one or more embodiments, a method may include determining, using computer hardware, a load of a synchronous circuit element within a circuit design tagged for forward retiming, traversing, using the computer hardware, each input of the load backward through the circuit design until a sequential circuit element or a primary input is reached, and adding, using the computer hardware, each synchronous circuit element encountered in the traversing to a forward retiming list. The method may also include, in response to determining that forward retiming criteria is met for the forward retiming list, modifying, using the computer hardware, the circuit design by creating a new synchronous circuit element at an output of the load.

In an aspect, the method may include detecting the tagged synchronous circuit element within the circuit design.

In another aspect, modifying the circuit design may include creating a synchronous circuit element at an output of each circuit element, other than the load, visited during the traversing that has at least one unvisited load pin.

In another aspect, modifying the circuit design may include removing selected synchronous circuit element(s) on the forward retiming list from the circuit design.

In another aspect, removing the selected synchronous circuit element(s) on the forward retiming list may include, for each pin of the load visited during the traversing and driven by an output pin of a synchronous circuit element on the forward retiming list, connecting the pin of the load to an input pin of the synchronous circuit element on the forward retiming list that drives the pin of the load.

In another aspect, determining that forward retiming criteria is met may include determining that the forward retiming list does not include a primary input and determining that each synchronous circuit element on the forward retiming list is a member of a same control set.

In another aspect, the method may include determining a type of the new synchronous circuit element and an initial value for the new synchronous circuit element.

In one or more embodiments, a method may include determining, using computer hardware, a driver of a synchronous circuit element within a circuit design tagged for backward retiming, traversing, using the computer hardware, each output of the driver forward through the circuit design until a sequential circuit element or a primary output is reached, and adding, using the computer hardware, each synchronous circuit element encountered in the traversing to a backward retiming list. The method may also include, in response to determining that backward retiming criteria is met for the backward retiming list, modifying, using the computer hardware, the circuit design by creating a new synchronous circuit element at an input of the driver.

In an aspect, the method may include detecting the tagged synchronous circuit element within the circuit design.

In another aspect, modifying the circuit design may include creating a new synchronous circuit element at each unvisited input pin of each combinatorial circuit element visited during the traversing.

In another aspect, modifying the circuit design may include removing each synchronous circuit element on the backward retiming list from the circuit design.

In another aspect, removing each synchronous circuit element on the backward retiming list may include, for each synchronous circuit element on the backward retiming list, connecting an output pin of the synchronous circuit element with an input pin of the synchronous circuit element.

In another aspect, determining that backward retiming criteria is met may include determining that the backward retiming list does not include a primary output and determining that each synchronous circuit element on the backward retiming list is a member of a same control set.

In another aspect, the method may include determining a type of the new synchronous circuit element and an initial value for the new synchronous circuit element.

In one or more embodiments, a system includes a memory configured to store program code and a processor coupled to the memory. The processor, in response to executing the program code, is configured to initiate operations. The operations may include determining a load of a synchronous circuit element within a circuit design tagged for forward retiming, traversing each input of the load backward through the circuit design until a sequential circuit element or a primary input is reached, and adding each synchronous circuit element encountered in the traversing to a forward retiming list. The operations may also include, in response to determining that forward retiming criteria is met for the forward retiming list, modifying the circuit design by creating a new synchronous circuit element at an output of the load.

In an aspect, the processor may be configured to initiate operations further including detecting the tagged synchronous circuit element within the circuit design.

In another aspect, modifying the circuit design may include creating a synchronous circuit element at an output of each circuit element, other than the load, visited during the traversing that has at least one unvisited load pin.

In another aspect, modifying the circuit design may include removing selected synchronous circuit element(s) on the forward retiming list from the circuit design.

In another aspect, removing the selected synchronous circuit element(s) on the forward retiming list may include, for each pin of the load visited during the traversing and driven by an output pin of a synchronous circuit element on the forward retiming list, connecting the pin of the load to an input pin of the synchronous circuit element on the forward retiming list that drives the pin of the load.

In another aspect, determining that forward retiming criteria is met may include determining that the forward retiming list does not include a primary input and determining that each synchronous circuit element on the forward retiming list is a member of a same control set.

In another aspect, the processor may be configured to initiate operations further including determining a type of the new synchronous circuit element and an initial value for the new synchronous circuit element.

In one or more embodiments, a system includes a memory configured to store program code and a processor coupled to the memory. The processor, in response to executing the program code, is configured to initiate operations. The operations may include determining a driver of a synchronous circuit element within a circuit design tagged for backward retiming, traversing each output of the driver forward through the circuit design until a sequential circuit element or a primary output is reached, and adding each synchronous circuit element encountered in the traversing to a backward retiming list. The operations may also include, in response to determining that backward retiming criteria is met for the backward retiming list, modifying the circuit design by creating a new synchronous circuit element at an input of the driver.

In an aspect, the processor may be configured to initiate operations further including detecting the tagged synchronous circuit element within the circuit design.

In another aspect, modifying the circuit design may include creating a new synchronous circuit element at each unvisited input pin of each combinatorial circuit element visited during the traversing.

In another aspect, modifying the circuit design may include removing each synchronous circuit element on the backward retiming list from the circuit design.

In another aspect, removing each synchronous circuit element on the backward retiming list may include, for each synchronous circuit element on the backward retiming list, connecting an output pin of the synchronous circuit element with an input pin of the synchronous circuit element.

In another aspect, determining that backward retiming criteria is met may include determining that the backward retiming list does not include a primary output and determining that each synchronous circuit element on the backward retiming list is a member of a same control set.

In another aspect, the processor may be configured to initiate operations further including determining a type of the new synchronous circuit element and an initial value for the new synchronous circuit element.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method of local forward retiming of a circuit design, comprising:
    determining, using computer hardware, a load of a synchronous circuit element within the circuit design for forward retiming;
    traversing, using the computer hardware, each input of the load backward through the circuit design;
    during the traversing, determining whether each element of the circuit design reached is a member of a group including a sequential circuit element and a primary input;
    adding, using the computer hardware, each synchronous circuit element encountered in the traversing to a forward retiming list;
    for each input of the load traversed, discontinuing the traversing of a path from the input in response to encountering an element of the circuit design determined to be a member of the group; and
    in response to determining that forward retiming criteria is met for the forward retiming list, modifying, using the computer hardware, the circuit design by creating a new synchronous circuit element at an output of the load.

2. The method of claim 1, wherein the determining the load of the synchronous circuit element is performed in response to detecting a non-synchronous circuit element that drives more than a minimum number of loads, wherein the non-synchronous circuit element is the load of the synchronous circuit element within the circuit design.

3. The method of claim 1, wherein the modifying the circuit design further comprises:
    creating a synchronous circuit element at an output of each circuit element, other than the load, visited during the traversing that has at least one unvisited load pin.

4. The method of claim 1, wherein the modifying the circuit design further comprises:
    removing a selected synchronous circuit element on the forward retiming list from the circuit design.

5. The method of claim 4, wherein the removing the selected synchronous circuit element on the forward retiming list comprises:

for each pin of the load visited during the traversing and driven by an output pin of a synchronous circuit element on the forward retiming list, connecting the pin of the load to an input pin of the synchronous circuit element on the forward retiming list that drives the pin of the load.

6. The method of claim 1, wherein the determining that forward retiming criteria is met comprises:
determining that each synchronous circuit element on the forward retiming list is a member of a same control set.

7. The method of claim 1, further comprising:
determining a type of the new synchronous circuit element and an initial value for the new synchronous circuit element.

8. A method of local backward retiming of a circuit design, comprising:
determining, using computer hardware, a driver of a synchronous circuit element within the circuit design tagged for backward retiming;
traversing, using the computer hardware, each output of the driver forward through the circuit design;
during the traversing, determining whether each element of the circuit design reached is a member of a group including a sequential circuit element and a primary output;
adding, using the computer hardware, each synchronous circuit element encountered in the traversing to a backward retiming list;
for each output of the load traversed, discontinuing the traversing of a path from the output in response to encountering an element of the circuit design determined to be member of the group; and
in response to determining that backward retiming criteria is met for the backward retiming list, modifying, using the computer hardware, the circuit design by creating a new synchronous circuit element at an input of the driver.

9. The method of claim 8, further comprising:
detecting the tagged synchronous circuit element within the circuit design.

10. The method of claim 8, wherein the modifying the circuit design further comprises:
creating a new synchronous circuit element at each unvisited input pin of each combinatorial circuit element visited during the traversing.

11. The method of claim 8, wherein the modifying the circuit design further comprises:
removing each synchronous circuit element on the backward retiming list from the circuit design.

12. The method of claim 11, wherein the removing each synchronous circuit element on the backward retiming list comprises:
for each synchronous circuit element on the backward retiming list, connecting an output pin of the synchronous circuit element with an input pin of the synchronous circuit element.

13. The method of claim 8, wherein the determining that backward retiming criteria is met comprises:
determining that each synchronous circuit element on the backward retiming list is a member of a same control set.

14. The method of claim 8, further comprising:
determining a type of the new synchronous circuit element and an initial value for the new synchronous circuit element.

15. A system configured for local forward retiming of a circuit design, the system comprising:
a processor configured to initiate operations including:
determining a load of a synchronous circuit element within a circuit design for forward retiming;
traversing each input of the load backward through the circuit design;
during the traversing, determining whether each element of the circuit design reached is a member of a group including a sequential circuit element and a primary input;
adding each synchronous circuit element encountered in the traversing to a forward retiming list;
for each input of the load traversed, discontinuing the traversing of a path from the input in response to encountering an element of the circuit design determined to be a member of the group; and
in response to determining that forward retiming criteria is met for the forward retiming list, modifying the circuit design by creating a new synchronous circuit element at an output of the load.

16. The system of claim 15, wherein the modifying the circuit design further comprises:
creating a synchronous circuit element at an output of each circuit element, other than the load, visited during the traversing that has at least one unvisited load pin.

17. The system of claim 15, wherein the modifying the circuit design further comprises:
removing a selected synchronous circuit element on the forward retiming list from the circuit design.

18. The system of claim 17, wherein the removing the selected synchronous circuit element on the forward retiming list comprises:
for each pin of the load visited during the traversing and driven by an output pin of a synchronous circuit element on the forward retiming list, connecting the pin of the load to an input pin of the synchronous circuit element on the forward retiming list that drives the pin of the load.

19. The system of claim 15, wherein the determining that forward retiming criteria is met comprises:
determining that each synchronous circuit element on the forward retiming list is a member of a same control set.

20. The system of claim 15, wherein the processor is configured to initiate operations further comprising:
determining a type of the new synchronous circuit element and an initial value for the new synchronous circuit element.

* * * * *